US012320153B2

(12) United States Patent
Hörberg et al.

(10) Patent No.: US 12,320,153 B2
(45) Date of Patent: Jun. 3, 2025

(54) ARRANGEMENT AND METHOD FOR PROVIDING STATUS OF AN ELECTROMAGNETIC PADLOCK

(71) Applicant: Swedlock AB, Halmstad (SE)

(72) Inventors: Johan Hörberg, Halmstad (SE); Magnus Nilsson, Laholm (SE); Martin Lindvall, Simlångsdalen (SE)

(73) Assignee: Swedlock AB, Halmstad (SE)

( * ) Notice: Subject to any disclaimer, the term of this patent is extended or adjusted under 35 U.S.C. 154(b) by 106 days.

(21) Appl. No.: 18/553,094

(22) PCT Filed: Nov. 4, 2021

(86) PCT No.: PCT/EP2021/080679
§ 371 (c)(1),
(2) Date: Sep. 28, 2023

(87) PCT Pub. No.: WO2022/207132
PCT Pub. Date: Oct. 6, 2022

(65) Prior Publication Data

US 2024/0183194 A1 Jun. 6, 2024

(30) Foreign Application Priority Data

Mar. 31, 2021 (WO) ................. PCT/SE2021/050294

(51) Int. Cl.
*E05B 41/00* (2006.01)
*E05B 35/00* (2006.01)
*E05B 67/38* (2006.01)

(52) U.S. Cl.
CPC ............ *E05B 41/00* (2013.01); *E05B 35/001* (2013.01); *E05B 67/38* (2013.01)

(58) Field of Classification Search
CPC ........ E05B 19/04; E05B 19/22; E05B 35/001; E05B 35/14; E05B 41/00;
(Continued)

(56) References Cited

U.S. PATENT DOCUMENTS

| | | | |
|---|---|---|---|
| 5,816,083 | A | 10/1998 | Bianco |
| 10,280,651 | B1 | 5/2019 | Hodge |

(Continued)

FOREIGN PATENT DOCUMENTS

| | | | |
|---|---|---|---|
| CN | 102704767 | B | 9/2014 |
| CN | 110176092 | A | 8/2019 |

(Continued)

OTHER PUBLICATIONS

Extended European Search Report Mailed Nov. 25, 2024, issued in European Patent Application No. 21 935 350.5, filed Nov. 4, 2021, 8 pages.

(Continued)

*Primary Examiner* — Gilbert Y Lee
*Assistant Examiner* — Yahya Sidky
(74) *Attorney, Agent, or Firm* — Christensen O'Connor Johnson Kindness PLLLC

(57) ABSTRACT

An arrangement and a method for an electromagnetic padlock (10) are disclosed. A handheld unit (30), which is movably connected via a connector member to a lock fitting (50) to be locked by a padlock (10), is removably attached to a padlock (10) during unlocking and locking. When the padlock (10) is locked, a magnetic sensor (44) of the electronic key (40) detects a change in detected magnetic flux from the attached magnet (31), representing a verification that the padlock has both been locked and locked at a correct location. Incorrect locking procedure, or locking at incorrect locations may generate warnings.

19 Claims, 17 Drawing Sheets

(58) Field of Classification Search
CPC ....... E05B 2045/065; E05B 2045/0665; E05B 47/0038; E05B 47/0045; E05B 2047/0067; E05B 2047/0084; E05B 2047/0088; E05B 67/0238; E05B 73/0047; E05B 73/0052
See application file for complete search history.

(56) References Cited

U.S. PATENT DOCUMENTS

| | | | |
|---|---|---|---|
| 2003/0160681 | A1 | 8/2003 | Menard et al. |
| 2008/0036596 | A1 | 2/2008 | Auerbach et al. |
| 2011/0050419 | A1 | 3/2011 | Ng et al. |
| 2012/0313752 | A1 | 12/2012 | Piccirillo et al. |
| 2015/0184423 | A1 | 7/2015 | Chen |
| 2018/0038135 | A1 | 2/2018 | Cooper |
| 2022/0381061 | A1* | 12/2022 | Hörberg ................ E05B 35/001 |

FOREIGN PATENT DOCUMENTS

| | | | |
|---|---|---|---|
| EP | 2 538 004 | A2 | 12/2012 |
| WO | 2012042515 | A1 | 4/2012 |
| WO | 2019240663 | A1 | 12/2019 |

OTHER PUBLICATIONS

International Search Report and Written Opinion mailed Dec. 1, 2021, issued in International Patent Application No. PCT/SE2021/050294, filed Mar. 31, 2021, 10 pages.
International Preliminary Report on Patentability mailed Oct. 3, 2023, issued in International Patent Application No. PCT/SE2021/050294, filed Mar. 31, 2021, 7 pages.
International Search Report and Written Opinion mailed Mar. 1, 2022, issued in corresponding International Patent Application No. PCT/EP2021/080679, filed Nov. 4, 2021, 8 pages.

* cited by examiner

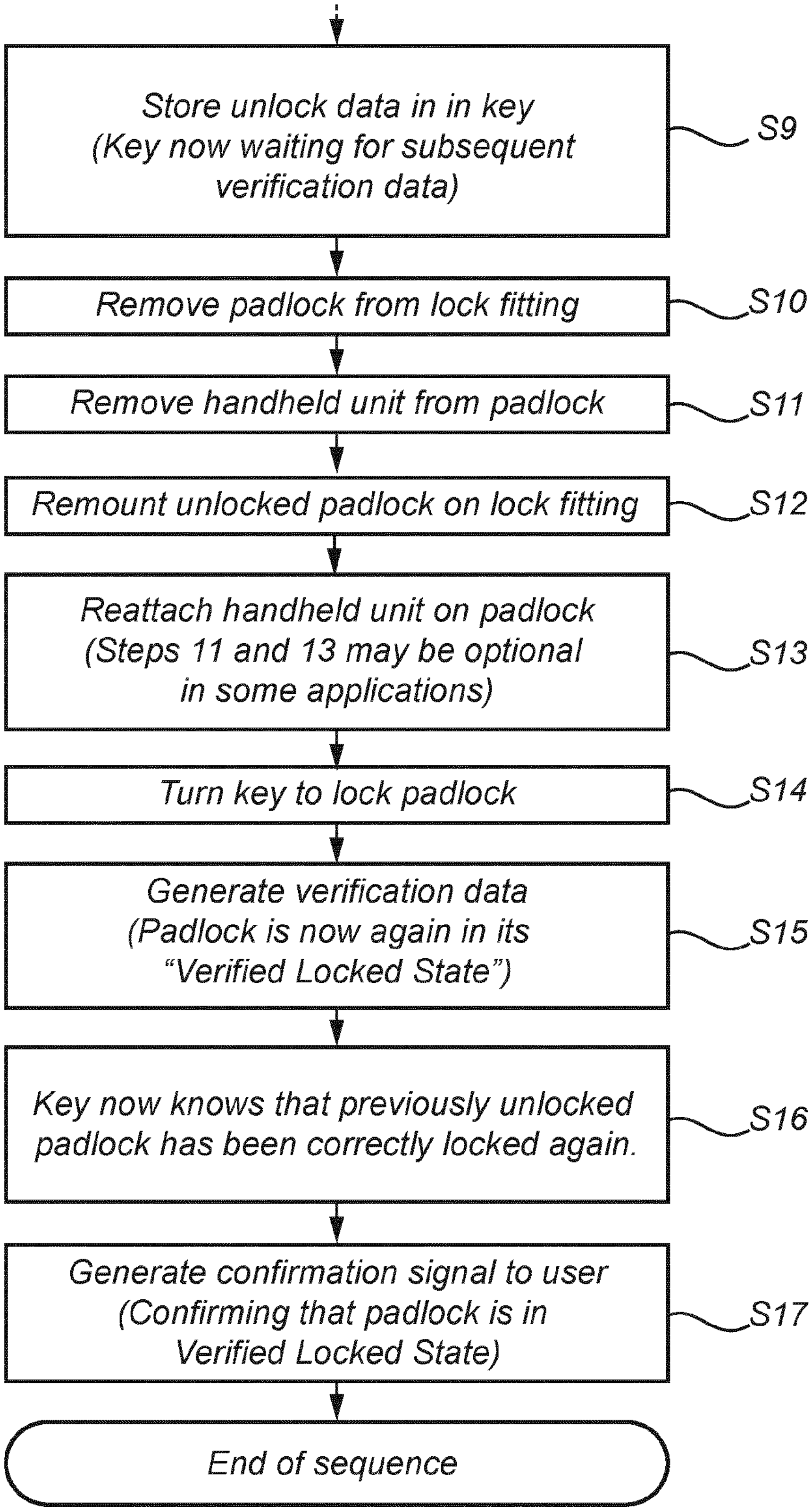
(cont.) Fig. 4B

ARRANGEMENT AND METHOD FOR PROVIDING STATUS OF AN ELECTROMAGNETIC PADLOCK

TECHNICAL FIELD

The present disclosure relates to the field of electromechanical padlocks operated by electronic keys. More specifically, the present disclosure relates to a padlock arrangement including an electromagnetic padlock, and to a method for providing status of an electromagnetic padlock.

BACKGROUND

Electromechanical padlocks are known in the art and may be used in places where a lock fitting can be locked by a padlock to prevent unauthorized access to e.g. a property, an entrance, or a cabinet. US 2011/0050419 A1 discloses a padlock mechanism and a sensor module that detects a state of the padlock mechanism and in response sends out a signal to a central unit. US 2012/0313752 A1 discloses a padlock using GPS for detecting the location each time a key card is used. U.S. Ser. No. 10/119,303B2 discloses a padlock comprising an RFID transponder in the padlock housing, wherein a RFID reading device is configured to read out the RFID transponder of the padlock. US2015/0292444, discloses a padlock with proximity detection.

However, the use of such electromechanical padlocks may be limited due to specific safety and/or security requirements.

SUMMARY OF INVENTION

In the light of the above, it is an object of the present inventive concept to provide a padlock arrangement, and a method for providing status of an electromagnetic padlock, wherein the above-mentioned disadvantages of the prior art are addressed.

According to a first aspect of the inventive concept, there is provided a padlock arrangement for locking a lock fitting, comprising:

- an electromechanical padlock;
- an electronic key arranged to be inserted into the padlock to an inserted position in which the electronic key is rotatable between a lock position in which the padlock is locked, and an unlock position in which the padlock is unlocked, said electronic key being provided with a position detecting device having at least one magnetic sensor; and
- a handheld unit having at least one magnet, said handheld unit being movably connected to the lock fitting via a connector member and being detachably attached to the housing in a position of use;
- wherein the position detecting device of the electronic key is arranged to detect the lock position of the electronic key, by the magnetic sensor detecting a first magnetic flux from the magnet of the handheld unit being attached to the padlock, as a verification that the padlock is locked and the handheld unit is attached to the padlock.

The inventive concept enables a locking and unlocking procedure that can be used with an enhanced level of security in a wide variety of applications. The lock fitting to be locked by the padlock may be a fitting used to hold a door, a gate or any other element closed or inaccessible. The lock fitting may typically comprise a hinged hasp with a slot fitting over staple for receiving a shackle of the padlock. Other types of lock fittings may also be used, such as sliding bolt gate latches. According to the inventive concept, the handheld unit including said at least one magnet is movably connected to the lock fitting. The connection may be a direct connection where the connector member is directly attached to a part of the lock fitting, for example connected to an outer end of a hasp. As an alternative, the connection may be an indirect connection where the connector element is attached to another element, such as door or a wall, adjacent the lock fitting.

An advantage of the inventive concept is that it provides a dual level of security. The detection of the lock position of the electronic key, by the magnetic sensor detecting the first magnetic flux from the magnet of the handheld unit, not only represents a verification of the locked status of the padlock. It also represents a verification that the padlock has been locked while the handheld unit is being attached to the padlock. Accordingly, detection of the lock position of the electronic key by detecting a first magnetic flux from the magnet of the attached handheld unit represents a verification or acknowledgement that the padlock both has been locked and that it has been locked at the right location adjacent the lock fitting, since the handheld unit is connected to the lock fitting via the connector member. Optionally, if the lock position of the key is not detected as defined above, an alert or warning may be generated. Such a warning may be implemented according to various processes and means. One warning method uses GPS. Data corresponding to the lock/unlock position of the electronic key may be transferred wirelessly from the electronic key to a mobile phone, a tablet or similar handheld electronic device carried by a user, and at least temporarily stored therein. In case the user moves away from the site more than a predetermined distance, or passes a virtual “geofence”, a warning may be generated if the mobile phone or the like has not received a verification from the electronic key that it is in its locked position, as detected via the magnet of the attached handheld unit. As an alternative, or in addition to the GPS based warning method, a warning may be generated if a lock verification has not been received from the electronic key within a predetermined time period.

A further advantage of the inventive concept is that the padlock is not required to be in its normal vertically hanging position during the key insertion and the key operation. This is especially an advantage where the lock fitting is arranged in a tight space or a space difficult to access for the user. Since the magnet required for the detection of the lock position of the electronic key is comprised in a handheld unit, which in its turn is movably connected to the lock fitting, the padlock may be held in various suitable inclined positions different from its final vertically hanging position during the key insertion and locking procedure for easier access to the padlock, while the handheld unit still being attached to the padlock to enable detection of the lock position of the electronic key even when the padlock is held in such an inclined position.

A further advantage of the inventive concept results from the handheld unit being detachably attached to the housing in its position of use. This allows a user to detach the handheld unit from the padlock after having unlocked the padlock in order to temporarily place the padlock at another place, and to reattach the handheld unit to the padlock before subsequently locking the padlock.

A further advantage of the inventive concept is that it allows a corresponding lock verification data to be generated and stored in the electronic key as “positive” confirmation log data, in response to the detection of the lock position of the electronic key. A given electronic key may as an option store log data associated with operating (locking/unlocking) a plurality of padlocks. Such stored log data may as an option be subsequently transferred to a synchronization unit, a cloud service, or the like.

Since the detection of the magnetic flux is performed by the combination of the magnet and the sensor which are not part of the padlock, a further advantage of the inventive concept is that it can be implemented with existing electromechanical padlocks without requiring any modification of the latter. The sensing of the electromagnetic flux may take place outside the padlock housing. The inventive concept may be used with existing electromechanical padlocks by designing the handheld unit so that it may be detachably attached to the housing of an existing electromechanical padlock. In preferred embodiments, the shape of the handheld unit is at least in part adapted to the outer shape of a housing of the padlock, such that the handheld unit may be attached with a rather close fit on the outer side of the padlock housing, at least in part. In such embodiment, the handheld unit will form an outer cover or "dress" over at least part of the padlock housing. In some embodiments, the handheld unit is essentially U shaped, so that it in its attached position covers at least part of two opposite main surfaces of the padlock housing and one side surface of the padlock housing. A bottom surface of the padlock housing where the electronic key is inserted may be uncovered, at least where the key opening is located.

Furthermore, in situations where the inventive concept is to be implemented in an existing setup including one or more existing electronic keys, and one or more existing electromechanical padlocks, not only the existing padlocks can be maintained in the setup but also the existing electronic keys can be used by providing each existing electronic key with a magnetic sensor. In some embodiment, the position detecting device and the at least one magnetic sensor may be arranged in an add-on unit which is attachable to an existing electronic key. In this way, an existing electronic key may be modified into an electronic key with a magnetic sensor that can be used in the inventive padlock arrangement.

According to the inventive concept, the lock position of the electronic key is detected in response to the electronic key being in its lock position and the first magnetic flux being detected. In some embodiments, in order to ensure that the padlock as such is actually locked when the lock position of the electronic key is detected, the padlock is designed such that the key may be withdrawn from the padlock only if the padlock is locked, i.e. such that the electronic key is prevented from being in its lock position unless the padlock itself is actually locked. Put in other words, it is preferred that the padlock is structured and arranged so that it cannot be locked from its unlocked position unless the key is present in the padlock. As an alternative, one may also consider padlocks having means for detecting if the shackle is locked or not, to prevent the verification data to be generated unless the padlock is locked.

In some embodiments, the position detecting device is further arranged, in response to the position detecting device detecting the lock position of the inserted electronic key via said first magnetic flux, to generate corresponding lock verification data representing said verification that the padlock is locked and the handheld unit is attached to the padlock, wherein the electronic key is arranged to at least temporarily store said verification data generated by the position detecting device. In other embodiments, the position detecting device may be arranged, in response to the position detecting device detecting the lock position of the inserted electronic key via said first magnetic flux, to change the contents of a database or list stored in the electronic key, such as entry or deletion of the corresponding padlock ID in the list. In simpler embodiments, the response may be a flashing light on the electronic key, as a visual feedback to the user representing the verified lock position. The functionality of the three embodiments described above in this paragraph may be combined and be present in one and the same embodiment.

In some embodiments, the position detection device of the electronic key is arranged to detect the lock position of the electronic key, by the magnetic sensor detecting said first magnetic flux, in response to at least one of:

- the inserted electronic key being rotated to its lock position,
- the electronic key being inserted into the padlock when the latter is already locked before the electronic key is inserted, and
- a user activation of the inserted electronic key in its lock position.

In each one of the above three situations, the magnetic sensor may sense the first magnetic flux from the magnet.

In some embodiments, the arrangement may be designed such that a further condition must be fulfilled before the above mentioned lock verification data is generated by the electronic key. Such a further condition may be that a padlock identity of the padlock is verified based on data communication between the inserted electronic key and the padlock. Each padlock may have a unique ID, and the padlock may be arranged to transmit its unique ID to an inserted electronic key. The electronic key may be arranged to verify the received unique padlock ID and to generate the lock verification data only when the further condition of having received a correct unique padlock ID is fulfilled. The key may also be arranged to send an ID request to the padlock. Furthermore, the electronic key may be arranged to store the verification data together with the associated padlock ID.

In some embodiments, the position detecting device is arranged to detect also the unlock position of the electronic key in response to the magnetic sensor of the key detecting a magnetic flux change from said first magnetic flux, as a confirmation that the padlock has been unlocked while the handheld unit was attached to the padlock. In such embodiments, the position detecting device may as an option be further arranged to generate corresponding unlock data in response to detecting said unlock position.

It may be noted that the position detecting device may be arranged to detect or establish the unlock position of the electronic key only when the detected magnetic flux change is a change from the first magnetic flux. The detected magnetic flux change may be a change from the first magnetic flux to a second magnetic flux different from the first magnetic flux. The detected flux change may be positive or negative. The detected magnetic flux change may also be a change from the first magnetic flux to a situation where the magnetic sensor does not detect any magnetic flux from the magnet. In such a case, the sensor output from the at least one magnetic sensor may be considered as a digital sensor output. This may be implemented by selecting the strength and the position of the magnet such that the magnetic sensor, when rotated away from the magnet to the unlock position of the electronic key, cannot detect any magnetic flux from the magnet. In any event, since the detection of the unlock position of the electronic key requires that the unlocking procedure is initiated while the first magnetic flux is being detected, the unlock position detected not only represents a confirmation of the unlocked status of the padlock. The detection also represents a confirmation that the padlock has been unlocked starting from a locked state with the handheld unit being attached to the padlock. In embodiments were also the unlock position of the electronic key is detected by use of the magnetic sensor, corresponding unlock data may optionally be generated, and at least temporarily stored in the electronic key until a lock position of the electronic key is subsequently detected by use of the magnetic sensor, as a receipt or verification that the padlock has been relocked and at the correct location with the handheld unit correctly attached.

In embodiments were also unlock data is generated as described above, the electronic key may be arranged to generate unlock confirmation data on the further condition that a padlock ID is received from the padlock, in order to store the unlock confirmation data in the key together with the associated padlock ID of the unlocked padlock.

In embodiments according to the above where also the unlock position of the electronic key is detected by use of the magnetic sensor and the handheld unit, the arrangement may be arranged to initiate a warning operation in response to the position detecting device of the electronic key having detected the unlock position of the electronic key but having not subsequently detected the lock position of the electronic key. Such a warning operation may be implemented by generating unlock confirmation data in response to detecting the unlock position of the electronic key by use of the magnetic sensor, and by at least temporarily storing the generated unlock confirmation data in the electronic key. In some embodiments, such generated unlock confirmation data may be a unique ID of the unlocked padlock. The unique ID of one or more unlocked padlocks may be at least temporarily stored in the electronic key. The generated unlock data may be stored until the lock position of the electronic key is subsequently detected by use of the magnetic sensor, representing a "lock receipt". Thereby, the arrangement may be designed such that once a padlock has been unlocked while the handheld unit is being attached to the padlock, it is required that the lock position of the electronic key is subsequently detected by use of the magnetic sensor. If the lock position of the electronic key is not subsequently detected by an electronic key "waiting" for such lock detection to occur, it is an indication or warning that either the padlock has still not been locked again, or that the padlock may perhaps have been locked again but without the handheld unit being attached. Thus, as long as a "waiting" key is not detecting the lock position of the electronic key, it is an indication warning that the padlock has still not been locked again at the correct location. For handling situations of such absent, unintended, or incorrect locking, the arrangement may further comprise warning means arranged to initiate a warning operation in response to the electronic key having initially generated and stored said unlock data but having not subsequently generated said verification data. Such warning means may be implemented at least partly in the key. Such warning means may be arranged to be activated in one or more different ways. In some embodiments, the warning means may activated by detecting movement of an electronic key which has generated and stored said unlock confirmation data but which has not subsequently generated a corresponding lock verification data. A warning may thus be generated to a user who is carrying the electronic key and moving away from the lock fitting location, if the user has first unlocked the padlock with the handheld unit attached but forgotten to correctly lock the padlock again with the handheld unit attached. As an alternative or an addition, one may use a geofence technology implemented in a handheld communication device (e.g. a mobile phone) receiving status information from the key, to activate the warning means if such an electronic key "waiting" to detect the lock position of the electronic key is moved away from the lock fitting outside a virtual geographic fence or boundary. The warning operation may include one or more warning operations, such as a sound alert and/or a visual alert generated by the electronic key and/or by a mobile phone or a handheld communication device communicating with the electronic key. The warning operation may also include triggering an app in a mobile phone to present a visual alert to a user and instructions to the user to take necessary steps to lock the padlock at the correct location. The warning operation may also include transmitting a corresponding error log data to an operation center or the like.

In embodiments according to the above where also unlock confirmation data is generated, such generated unlock confirmation data which is not followed by a corresponding detection of the lock position of the electronic key may be kept stored in the electronic key and/or in the a handheld communication device as error-indicating log data until such error-indicating log data is subsequently transferred to a synchronization unit, to the cloud, or similar.

In some embodiments, the handheld unit is shaped such that it, in its position of use, extends over two or more sides of a housing of the padlock. In preferred embodiments, the handheld unit may comprise an essentially U shaped attachment member which extends at least partly over the padlock housing. In the position of use of the handheld unit, such a U shaped attachment member may cover at least partly a front surface of the housing, at least partly a rear surface of the housing, and at least partly one of the side surfaces of the housing. The side surfaces of padlocks may have different shapes, such as combinations of one or more rounded and/or angled surfaces. In some embodiment, the handheld unit comprises an attachment member having a shape corresponding to the external shape or contour of the padlock housing, to obtain a dimensional fit between the handheld unit and the padlock housing.

In some embodiments, to prevent the handheld unit from being unintentionally detached from the padlock, the handheld unit is configured to be resiliently attached to the housing it in the position of use. Such resilient attachment may be implemented by one or more resilient tongues exerting a biasing force on the housing in the position of use. Such resilient attachment may also or in addition be implemented by making the overall U shaped attachment member resilient. When such a resilient attachment member is slid or positioned over the padlock housing, rounded, or angled side surfaces of the padlock housing may be used during attachment to expand the resilient attachment member into a biased state.

In some embodiments, the handheld unit may be structured and arranged to be mechanically locked to the padlock in response to locking the padlock. When the padlock is not locked, the handheld unit can be attached and detached from the padlock, but when the padlock is locked, the handheld unit cannot be removed from the padlock. This may be implemented by providing a shackle receiving opening in the handheld unit. Such an opening may arranged such that when the handheld unit has been brought to its position of use on an unlocked padlock, the shackle receiving opening is positioned to receive a free end of a padlock shackle for preventing the handheld unit from being detached from the subsequently locked padlock. In preferred embodiments, such a shackle opening may be combined with the above described U shaped configuration. As an example, the hand-held unit may comprise an attachment member which in the position of use covers not only a least partly a front surface, a rear surface, and one of the side surfaces of the housing, but also covers at least partly a top surface of the padlock where the shackle is located. The shackle opening is then provided in the part of the attachment member that at least partly covers the top surface of the padlock.

In some embodiments, the design or shape of the hand-held unit is such in relation to the design or shape of the padlock housing that the handheld unit can only be attached in its intended correct position, to ensure that the at least one magnet is correctly positioned. As a non-limiting example, the handheld unit may be provided with at least one projecting member, such as a pin, which can be received in a corresponding opening in the padlock housing only when the handheld unit is correctly oriented in relation to the padlock. If the handheld unit is incorrectly oriented, the projecting member will prevent the handheld unit from being attached.

A further advantage of the inventive concept is that it can be implemented such that the magnetic detection can be performed without any need for undesired intervention in the padlock housing, such as forming openings in the housing for the magnetic detection. The magnetic sensor of the inserted electronic key, and at least part of the magnet of the handheld unit may both be located outside the housing of the padlock, such that the magnetic sensor may sense a magnetic flux from the magnet outside the padlock housing. In some embodiments, the electronic key is arranged to be inserted at a bottom side of the padlock, said bottom side being defined by a plane, wherein said at least one magnet of the handheld unit, when the latter is attached to the padlock, is located at least partly on a side of said plane facing away from the padlock. Preferably, the magnetic sensor is located outside the padlock when the electronic key is in its inserted position in the padlock.

In some embodiments, the connector member comprises a chain, a wire, or another type of elongate flexible or bendable member. Typically, a handheld unit not being attached to a padlock may be hanging close to the lock fitting at a height convenient for the user. In preferred embodiments, the connector member has a length which is sufficient to allow the padlock to be held in a non-vertical spatial position for key operation, while the handheld unit being in its position of use attached to the padlock and while a shackle of the padlock at the same time is in engagement with the lock fitting. This may be an advantage in certain applications and locations where key access to a vertically hanging padlock is difficult or even not possible. The user may then hold the padlock with the handheld unit being attached in an inclined position towards the user for easier key operation.

In some embodiments, said at least one the magnetic sensor comprises a Hall element sensor. A Hall element sensor has the advantage that it generates sensor signals also when the detected magnetic flux is non-varying. Thereby, when the core is in its lock position, the magnetic sensor can continuously detect said first magnetic flux from the magnet. As an alternative, the magnetic sensor may also comprise magnetically controllable tongue elements.

In some embodiments, the electromechanical padlock is configured to be powered upon insertion of the electronic key in the key receptacle. To this end, the electronic key may comprise a power source and power transmitting means, and the padlock may comprise power receiving means.

In some embodiments, the electronic key may be a programmable electronic key for storing data required for opening the padlock.

According to a second aspect of the inventive concept, there is provided a method for providing status of an electromechanical padlock, said method comprising:

- removably attaching a handheld unit to a padlock, said handheld unit having at least one magnet and being movably connected via a connector member to a lock fitting to be locked by the padlock;
- while the handheld unit is being in its position attached to the padlock, locking the padlock by turning an electronic key inserted into the padlock, said electronic key being provided with at least one magnetic sensor which, by said turning the electronic key for locking the padlock, is rotated to a rotational position where a first magnetic flux from the at least one magnet of the attached handheld unit is detected by the magnetic sensor, representing a verification that the padlock has been locked while the handheld unit is attached to the padlock.

In some embodiments, the method further comprises, in response to detecting said first magnetic flux by the magnetic sensor, generating corresponding lock verification data in the electronic key representing a verification that the padlock has been locked while the handheld unit is attached to the padlock, and at least temporarily storing said generated verification data in the electronic key.

In some embodiment of the method, said first magnetic flux from the at least one magnet of the attached handheld unit is detected by the magnetic sensor in response to at least one of the actions of:

- rotating the inserted electronic key to its lock position,
- inserting the electronic key into the padlock when the latter is already locked before the electronic key is inserted, and
- performing a user activation of the electronic key while the electronic key is in its lock position in the padlock.

In some embodiments, the method further comprises, before said act of locking the padlock:

- in optional order: inserting the electronic key into the padlock while the padlock is locked, and attaching the handheld unit to the padlock; and
- while the handheld unit is being attached to the padlock, unlocking the padlock by turning the inserted electronic key, wherein said magnetic sensor, by said turning the electronic key to unlock the padlock, is rotated to detect a change in magnetic flux from said first magnetic flux to a second magnetic flux, or to a zero-magnetic flux, representing said confirmation that the padlock has been unlocked while the handheld unit was attached to the padlock.

In some embodiments, the method further comprises, in response to said change in magnetic flux being detected, generating corresponding unlock confirmation data representing said confirmation that the padlock has been unlocked while the handheld unit was attached to the padlock; and at least temporarily storing said unlock confirmation data in the electronic key.

The above and other optional features and advantages of the inventive concept are set out in the claims and will be further described by examples in the following.

BRIEF DESCRIPTION OF THE DRAWINGS

The inventive concept, some non-limiting embodiments, and further advantages of the inventive concept will now be described with reference to the drawings in which:

FIGS. 4A-4B is a flowchart comprising steps performed in FIGS. 3A-3I.

DETAILED DESCRIPTION OF PREFERRED EMBODIMENTS

The inventive concept will now for the purpose of exemplification be described in more detailed by means of examples and with reference of the accompanying drawings illustrating embodiments of the inventive concept. The present invention may, however, be embodied in many different forms and should not be construed as limited to the embodiments set forth herein; rather, these embodiments are provided for thoroughness and completeness, and to fully convey the scope of the inventive concept to the skilled addressee.

1$^{st}$ Embodiment

Figure 1:
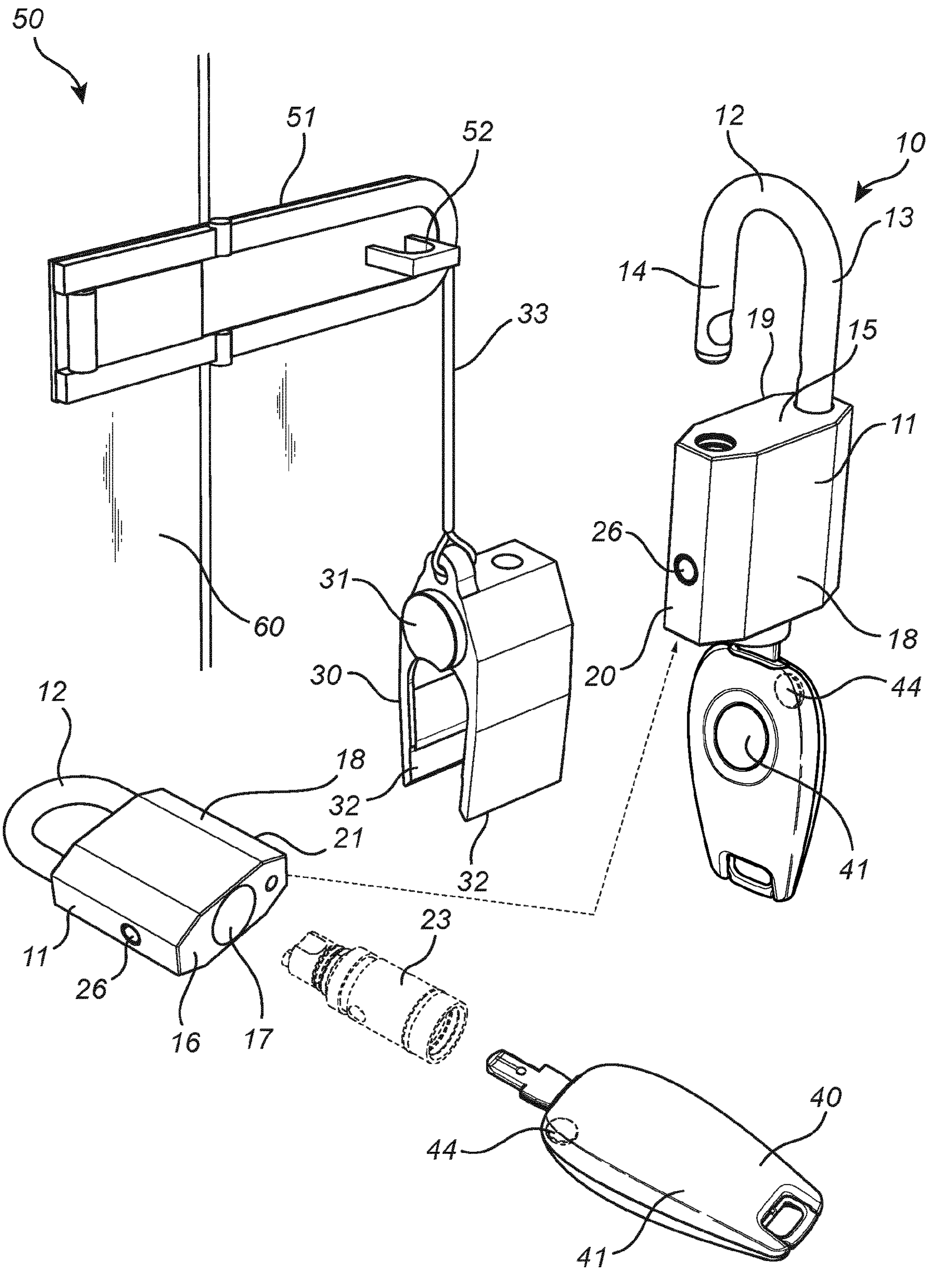
FIG. 1 shows a padlock arrangement according to a first embodiment.

FIG. 1 schematically illustrates an electromagnetic padlock arrangement according to a first embodiment. The padlock arrangement comprises an electromechanical padlock 10, a handheld unit 30, and an electronic key 40. The arrangement is used for locking a lock fitting 50. In this embodiment, the lock fitting 50 comprises a hasp 51 attached to a door 60 and a staple 52. The inventive concept may be used with other types of lock fittings.

The padlock 10 comprises a padlock housing or body 11, and a U-shaped shackle 12 having a first leg 13 rotatably connected to the housing 11 and a second leg 14 which can be freed from the housing 10 upon unlocking the padlock 10. The padlock housing 11 has a top surface 15 where the shackle 12 is arranged, and an opposite bottom surface 16 presenting an opening 17. The housing 11 further has a front surface 18, an opposite rear surface 19, and two smaller opposite side surfaces 20 and 21.

The padlock 10 further comprises a lock core 23 which is received in the opening 17 of the housing 11 and which is rotatably arranged within the housing 11 for locking and unlocking the padlock 10. One or more fixing means (not shown) are arranged to prevent the lock core 23 from being disengaged from the housing 11. The lock core 23 is configured to be rotated by an electronic key 40 to move a lock bolt member or similar (not shown) of the padlock 10. Accordingly, the lock core 23 and the electronic key 40 are arranged to rotate together locking and unlocking the padlock. The lock bolt member may be arranged to interact with the shackle 12 in a known manner for locking and unlocking the padlock 10. The rotational positions of the electronic key 40 will be referred to as the lock position in which the padlock 10 is locked, and the unlock position in which the padlock 10 is unlocked.

The electronic key 40 is used to operate the electromechanical padlock 10. The electromechanical padlock 10 comprises an access control device (not shown) for controlling access of an inserted electronic key 40. In the illustrated embodiment, the electronic key 40 is a programmable key. Before the electronic key 40 can be used, it must be activated by the user. In the illustrated embodiment, key activation is performed by the user pressing an activation button 41 on the electronic key 40. When activated, an LED on the electronic key 40 may give a visual feedback to the user (see FIG. 3A). In other embodiments, no user-activation is needed.

Figure 5:
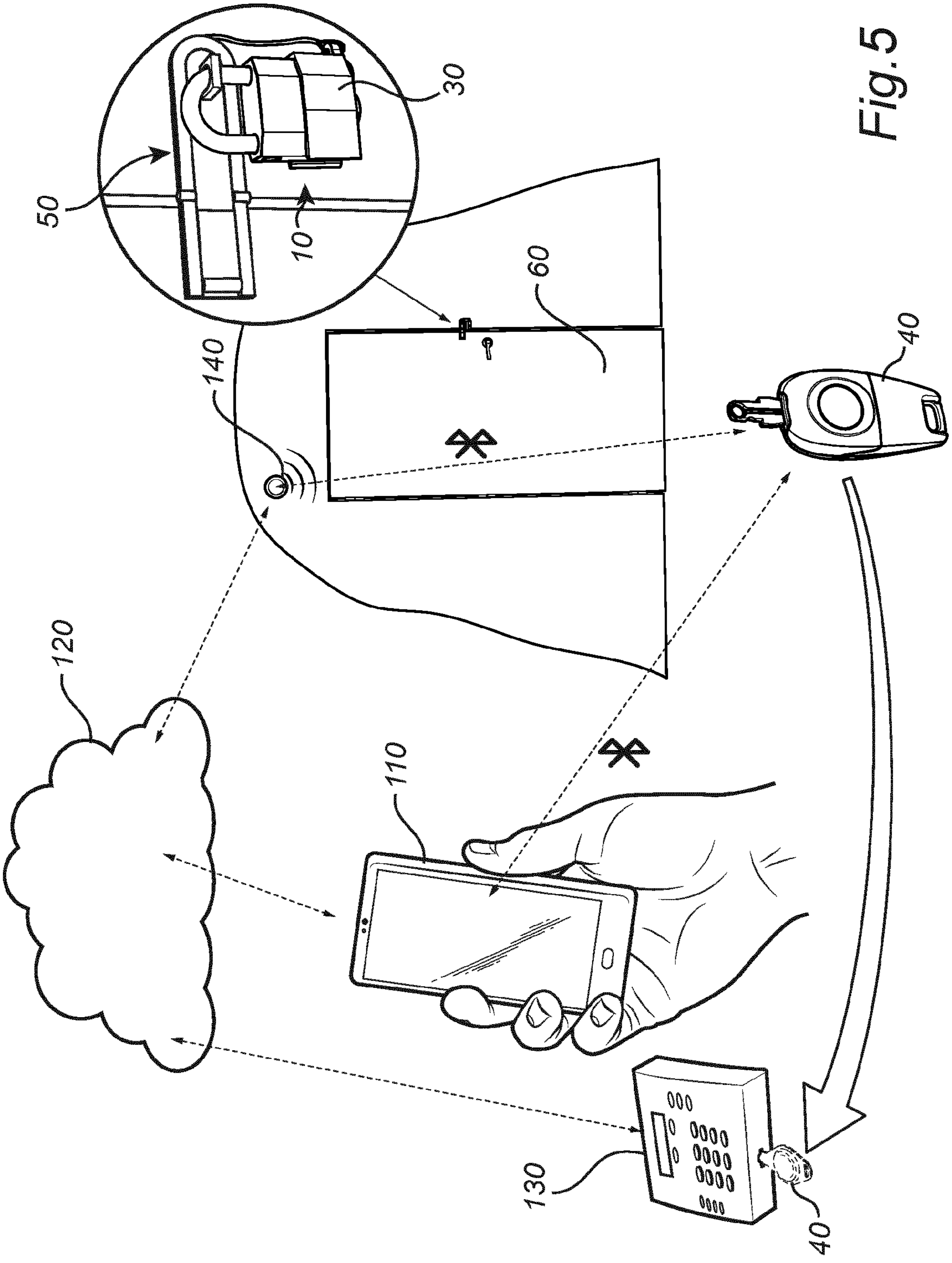
FIG. 5 shows a system incorporating a padlock arrangement.

The electronic key 40 comprises an energy source (not shown), such as a battery, and an electronic control unit (not shown) powered by the energy source. The electronic key 40 preferably also comprises at least one memory for storing data. As illustrated in FIG. 5, the electronic key 40 can access a cloud based service 120 via a gateway 140 and/or a locally hosted access control system, for transferring authorization data to the electronic key 40 or log information from the electronic key 40 to the access control system via internet 120 and a synchronization unit 130 or via a mobile communication system such as the GSM net and a mobile device, such as a mobile phone 110. The electronic key 40 is able to communicate with the synchronization unit 130 or the mobile device 110. Such communication may comprise one or more of a physical contact, near field communication, such as NFC, and radio communication, such as Bluetooth.

The electronic key 40 can store all or at least part of data necessary to access one or more specific electromechanical padlocks 10. The electronic key 40 is not able to unlock electromechanical locks for which it does not have the appropriate authorization data. These aspects will be described later in connection with an example illustrated in FIG. 7. Locking and unlocking of a padlock 10 using the electronic key 40 is rendered possible only if the electronic key 40 is synchronized appropriately via the synchronization unit or a mobile device. Further, the electronic key 40 is preferably provided with means by which electrical power, data and mechanical effort can be transmitted to the padlock in a known manner. In this embodiment, the electromechanical padlock 10 is configured to be powered by and communicate with the electronic key 40 upon the insertion of an activated electronic key 40 in the padlock 10. To this end the electromechanical padlock 10 comprises power receiving means, communication means and an electrical control unit (not shown).

The electronic key 40 in FIG. 1 further comprises a position detecting device which includes at least one magnetic sensor 44 arranged to rotate together with the electronic key 40. In the illustrated embodiment, the magnetic sensor 44 is located at a part of the electronic key 40 which is not inserted into the padlock housing 11. When the electronic key 40 is in its inserted position in the padlock housing 11, such as shown in the upper right part of FIG. 1, then the magnetic sensor 44 is preferably located close to the bottom 16 of the padlock housing 11. In the illustrated embodiment, the magnetic sensor 44 has a limited extension in the circumferential direction in relation to the rotational axis of the key. When electronic key 40 is in its unlock position as shown in FIG. 1, the magnetic sensor 44 is turned away from the side surface 20 of the housing 11. The position detecting device is arranged to detect at least the lock position of the electronic key 40 in response to the magnetic sensor 44 detecting a first magnetic flux from an externally attached magnet 31 as will be described below.

In the illustrated embodiment, the magnetic sensor 44 is a Hall element sensor. An advantage of using a Hall element sensor is that it sends signals even when a detected magnetic flux is non-varying. Accordingly, the magnetic sensor 44 will be able to detect magnetic flux from the magnet 31 even when the key is not moving.

Figure 2A:
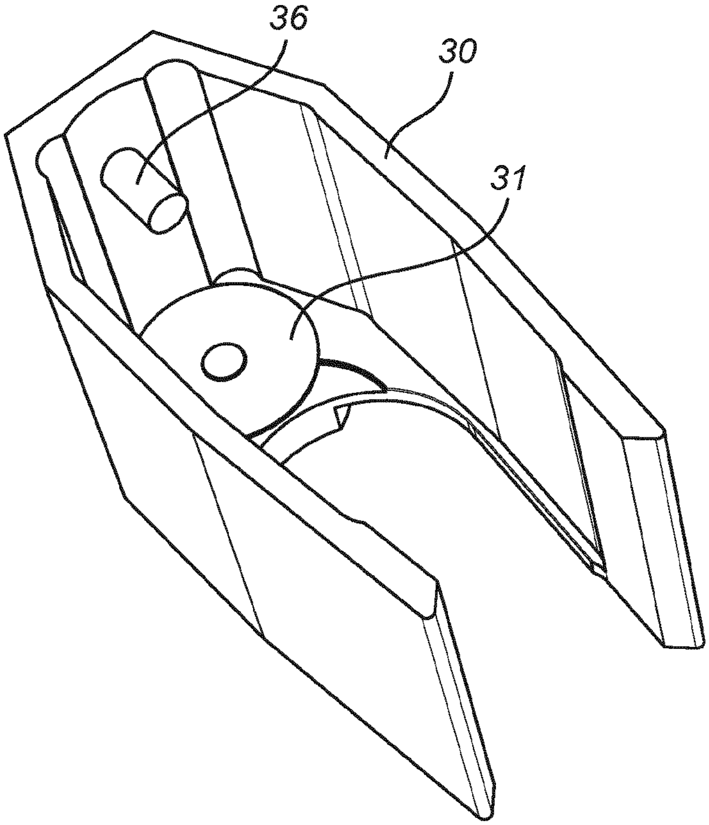
FIGS. 2A and 2B show an embodiment of a handheld unit.
Figure 2B:
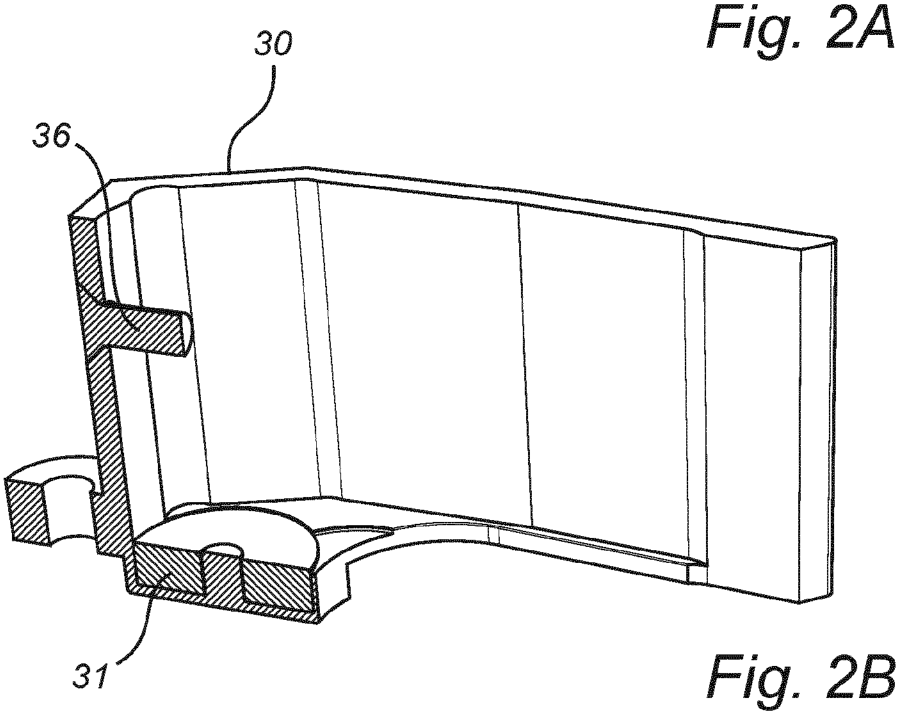

Referring to FIG. 1, and FIGS. 2A and 2B, the padlock arrangement further comprises an essentially U-shaped handheld unit 30 having at least one magnet 31. The handheld unit 30 is movably connected to the lock fitting 50 via a connector member 33 and can be detachably attached to the padlock housing 11. The attached position shown in FIG. 3A will be referred to as the "position of use" of the handheld unit 30. The handheld unit 30 is intended to be permanently connected to the lock fitting 50 via the connector member 33, which means that the handheld unit 30 is always located close or near the lock fitting 50. This has the advantage that incorrect handling of the padlock 10 may be detected and prevented and corrected, ensuring that the padlock 10 is in the correct location near the lock fitting when locked. In the illustrated embodiment, optional means are provided to ensure that the handheld unit 30 is correctly oriented in relation to the padlock 10. In the illustrated embodiment, such means include a pin 36 arranged at the bottom of the U-shaped handheld unit 30 as shown in FIG. 2A, and a corresponding opening 26 in the side surface 20 of the padlock housing 11 for receiving the pin 36. As shown at the lower part of FIG. 3G, when the handheld unit 30 is correctly positioned in relation to the padlock housing, the pin 36 is aligned with and can be received in the opening 26, allowing the handheld unit 30 to be correctly attached. In incorrect orientations of the handheld unit 30, the pin 36 will prevent the handheld unit 30 from being attached to the padlock 10.

As shown in FIGS. 2A and 2B, the handheld unit 30 may also be provided with a bottom part which in use of the handheld unit is located over a part of the bottom side 16 of the padlock housing 11. Thereby, the handheld unit 30 can be correctly positioned in the top-bottom direction of the housing 11. In the illustrated embodiment, said bottom part of the handheld unit 30 supports the magnet 31.

The handheld unit 30 may be "flexible" in the sense that one handheld unit design may be used for various padlocks having different shapes, or padlocks having different shackle dimensions. For instance, the U shaped attachment part may be flexible to adapt to varying padlock thickness. Also, the opening or openings for the shackle may be oversized to be able to receive different sized shackles.

Figure 3A:
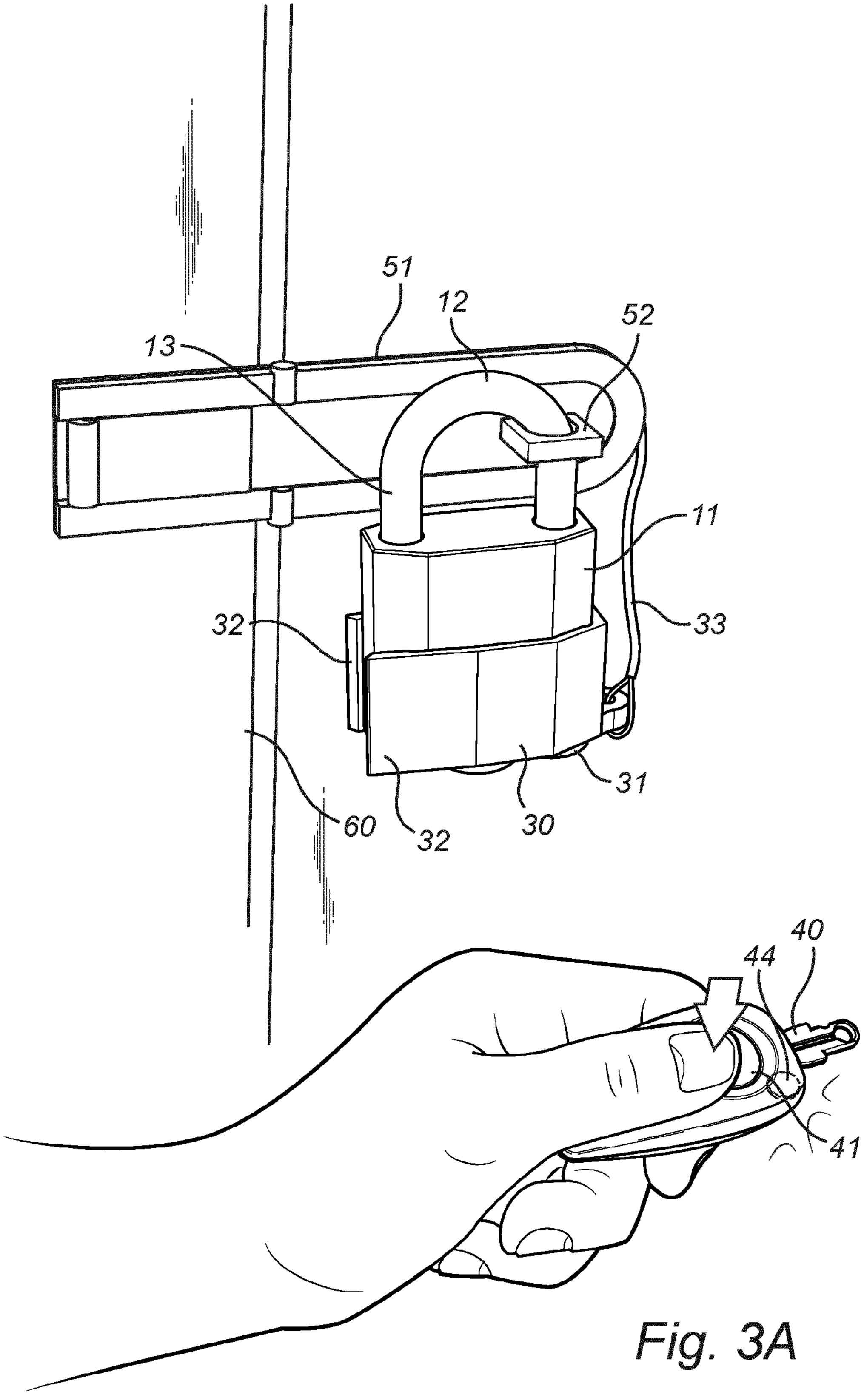
FIGS. 3A-3I show a sequence of steps for unlocking and locking the padlock arrangement in FIG. 1.
Figure 3B:
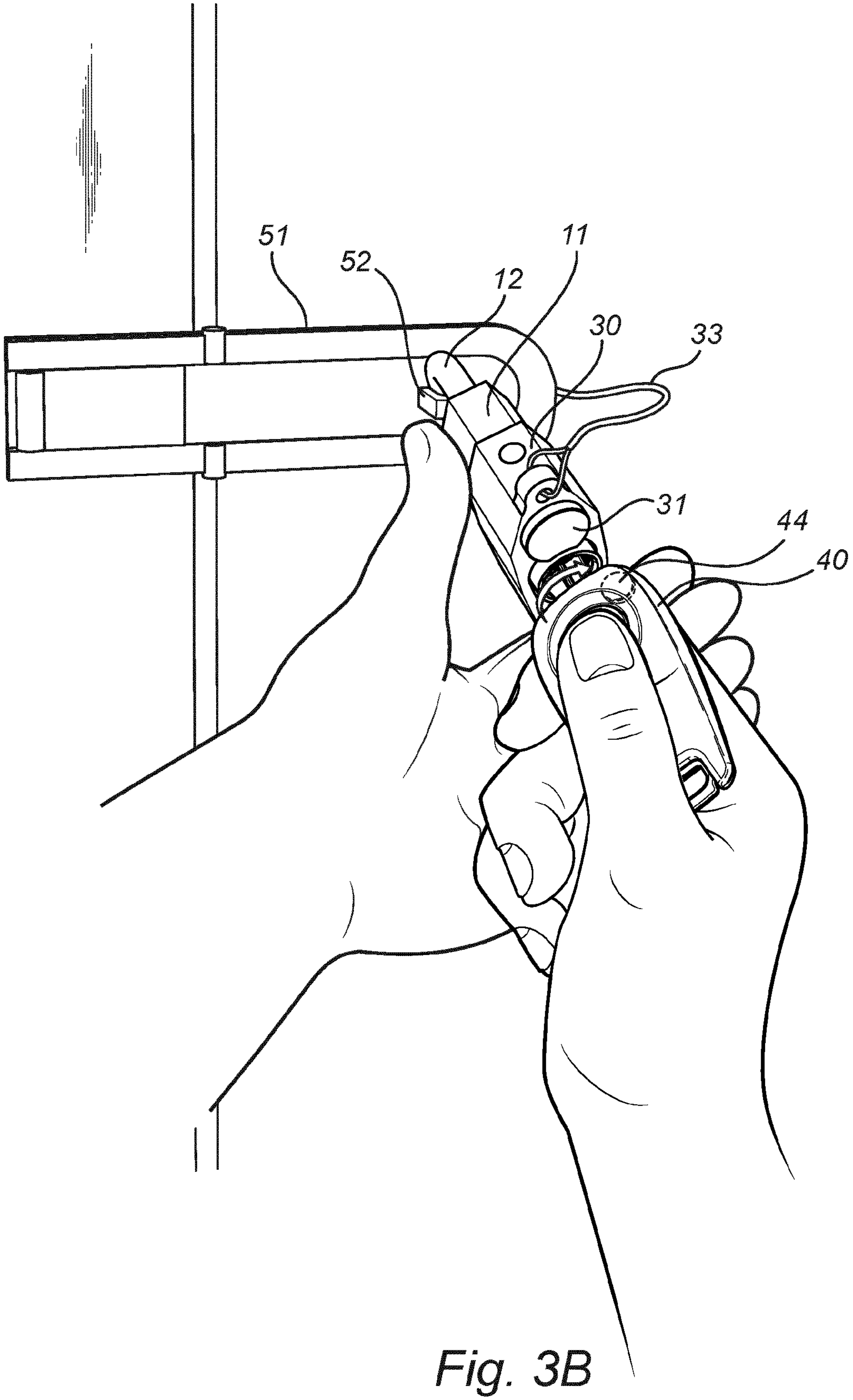

As shown in FIG. 3B, the connector member 33 is structured and arranged such that the padlock 10 with the handheld unit 30 being attached thereto can be freely held by the user in a convenient orientation and position for key operation, especially in an orientation different from the normal gravity-based vertical hanging orientation of the padlock 10. Typically, the padlock shackle 12 will be in engagement with the staple 52 while the user is holding the padlock 10 in such an inclined position. For this purpose, the connector member 33 may be a chain, a wire, or any suitable type of elongate flexible/bendable member. The length of the connector member 33 may vary depending on type of lock fitting, available space, etc. The length is preferably selected such that the length on the one hand allows the required maneuverability by the user for key operation, and on the other hand ensures that the handheld unit 30 is sufficiently close to the lock fitting 50. A suitable length may for example be less than 10 cm, less than 15 cm, or less than 20 cm. It may also be possible to use a connector member 30 having variable length with elastic and/or spring properties.

The handheld unit 30 is arranged to be detachably attached to the padlock housing 11. The advantage of having the handheld unit 30 attached to the housing 11 (instead of only held against the housing) is to ensure that the magnet 31 is correctly positioned during locking and unlocking. The attachment may be accomplished in many ways. In the illustrated embodiment, the handheld unit 30 is essentially U shaped and may be manufactured from a metal and/or or a plastic material.

The handheld unit 30 is preferably designed such that, when the handheld unit 30 is in its position of use attached to the padlock 10, the magnet 31 of the handheld unit 30 is located close to the inserted electronic key 40. The magnet 31 is shaped and located such that the magnetic sensor 44 of the key 40 will sense a varying magnetic flux when the inserted electronic key 40 is turned. The magnet 31 is preferably located such that at least part of its magnetic flux may be sensed by the magnetic sensor 44 without passing through the padlock housing 11. In the illustrated embodiment, where the bottom side 16 of the padlock housing 11 is defined by a geometric plane, both the magnet 31 and the magnetic sensor 44 are located on the side of said geometric plane facing away from the padlock housing 11. As shown in FIG. 3G, the U shaped unit 30 is arranged to be slid over the padlock housing 11 from one side, such that in its position of use it partly covers the front surface 18, the rear surface 19, and the side surface 20 of the padlock housing 11. Two attachment tongues 32 engaging the side surface 21 provides the detachable engagement. Thus, in this embodiment, the handheld unit 30 is resiliently attached to the housing 11. One end of the connector member 33 is attached to the base of the U, while the other end of the connector member 33 is attached to the outer end of the hasp 51.

As mentioned above, the magnetic flux is preferably detected at least partly without passing through the padlock housing 11. However, it will be appreciated that the material of the housing 11 at the location of the magnet 31 may be selected such that the magnetic flux may also be detected at least in part through such material. The entire housing 11 or at least part thereof, can be made from a material allowing magnetic flux from the magnet 31 to be detected by the magnetic sensor 44 through such material. Such material include at least brass and aluminum. However, the padlock housing 11 may also be made from a material not allowing magnetic flux to pass. For instance, for stronger padlocks, a stronger material such as steel may be used for the entire or a major part of the padlock housing 11.

The position detecting device of the electronic key 40, including the magnetic sensor 44, is arranged to detect at least the lock position of the electronic key 40 in response to the magnetic sensor 44 detecting a first magnetic flux from the magnet 31 of the attached handheld unit 30. This detection represents a verification that the padlock 11 has been locked while the handheld unit 30 was attached to the padlock 10. In the following, this verification is referred to as "lock verification". In optional embodiments as the one illustrated here, in response to detecting said lock position by detecting said first magnetic flux, the position detection device of the electronic key 40 may generate lock verification data, representing said lock verification that the padlock 11 has been locked while the handheld unit 30 was attached to the padlock 10. The lock verification data thus represents a verification that the padlock 10 has been locked and is in the correct location near the lock fitting 50. In the following, this locked state of the padlock 10 will be referred to as a "verified locked state". In some embodiments of the inventive concept, the detection of the lock position of the electronic key by using the magnetic sensor may trigger other actions than generating a lock verification data, or actions in addition to generating the lock verification data. As an example of such additional actions, in response to the detection of the lock position of the electronic key by using the magnetic sensor, a unique padlock ID of the padlock 10 may be stored in a database or list in the electronic key 40. Such an embodiment will be describer later in connection with FIG. 7.

In preferred embodiments, the inventive padlock arrangement is arranged to detect also when the padlock 10 is being unlocked from a verified locked state, by detecting the unlock position of the electronic key using the magnetic sensor. This may be implemented by detecting a change of magnetic flux from said first magnetic flux. In the illustrated embodiment, the position detecting device is arranged to detect also the unlock position of electronic key 40 in response to the magnetic sensor 44 detecting a magnetic flux change from said first magnetic flux. In this embodiment, the position detecting device is further arranged to generate unlock confirmation data in response to detecting said unlock position as a confirmation that the padlock 11 has been unlocked from a verified locked state. The electronic key 40 now "waits" for an acknowledgement that the padlock 10 has been brought back to its verified locked state.

It may be noted that the padlock arrangement may be such that the magnet 31 is not required for unlocking the padlock 10. The magnet 31 and the position detecting device are in this embodiment arranged to provide an additional level of security, for verifying that the padlock 10 is handled correctly and being both locked and unlocked at the correct location.

Operation of $1^{st}$ Embodiment

The operation of the $1^{st}$ embodiment in FIG. 1 will now be described with reference to FIGS. 3A-3I, and the flow chart in FIGS. 4A-4B.

FIG. 3A illustrates an initial state where the electromechanical padlock 10 is in a verified locked state, that is the padlock 10 is both locked and is in correct location (near the lock fitting) with the handheld unit 30 attached. Steps S1 to S3 in the flowchart in FIG. 3 are now to be performed. A user intending to unlock the padlock 10 is carrying a programmable electronic key 40 and a mobile phone 110 with an installed associated app. The user activates the electronic key 40 by pressing the activation button 41. The electronic key 40 may thereby receive authorization data from a cloud based or locally hosted access control system 120, 130. The key 40 acknowledges the activation by briefly flashing the LED of the key 40. Such data may also have been pre-stored in the electronic key 40.

In FIG. 3B (Step 4), the activated key 40 is inserted into the lock core 23. The padlock 10 is thereby powered by the key 40. The key 40 communicates with electronics in the lock core 23. An authorization code transmitted from the key 40 to the lock core 23 is verified by the electronics in the padlock 10. An electromagnet (not shown) is activated in the padlock 10, allowing the padlock shackle 12 to be opened. When the key 40 is inserted, the key 40 is in its lock position, where the magnetic sensor 44 of the electronic key 40 is detecting a first magnetic flux from the attached magnet 31. As described above, this is a verified locked state of the padlock 10. The position detecting device of the electronic key 40 now generates the lock verification data (Step S5 and Step S6). In simpler embodiments, this initial generation of verification data may be dismissed with. However, it may give an additional security. If for instance the lock verification data is not received upon key insertion, the key 40 "knows" that there something wrong, for instance that the handheld unit 30 is not attached to the padlock 10 and/or the shackle 12 is not correctly locked in the housing 11. The user now turns the key 40 as illustrated by the arrow in FIG. 3B to unlock the padlock 10 (Step S7). In other embodiment, other or additional events may be triggered in response to inserting the key 40.

Figure 3C:
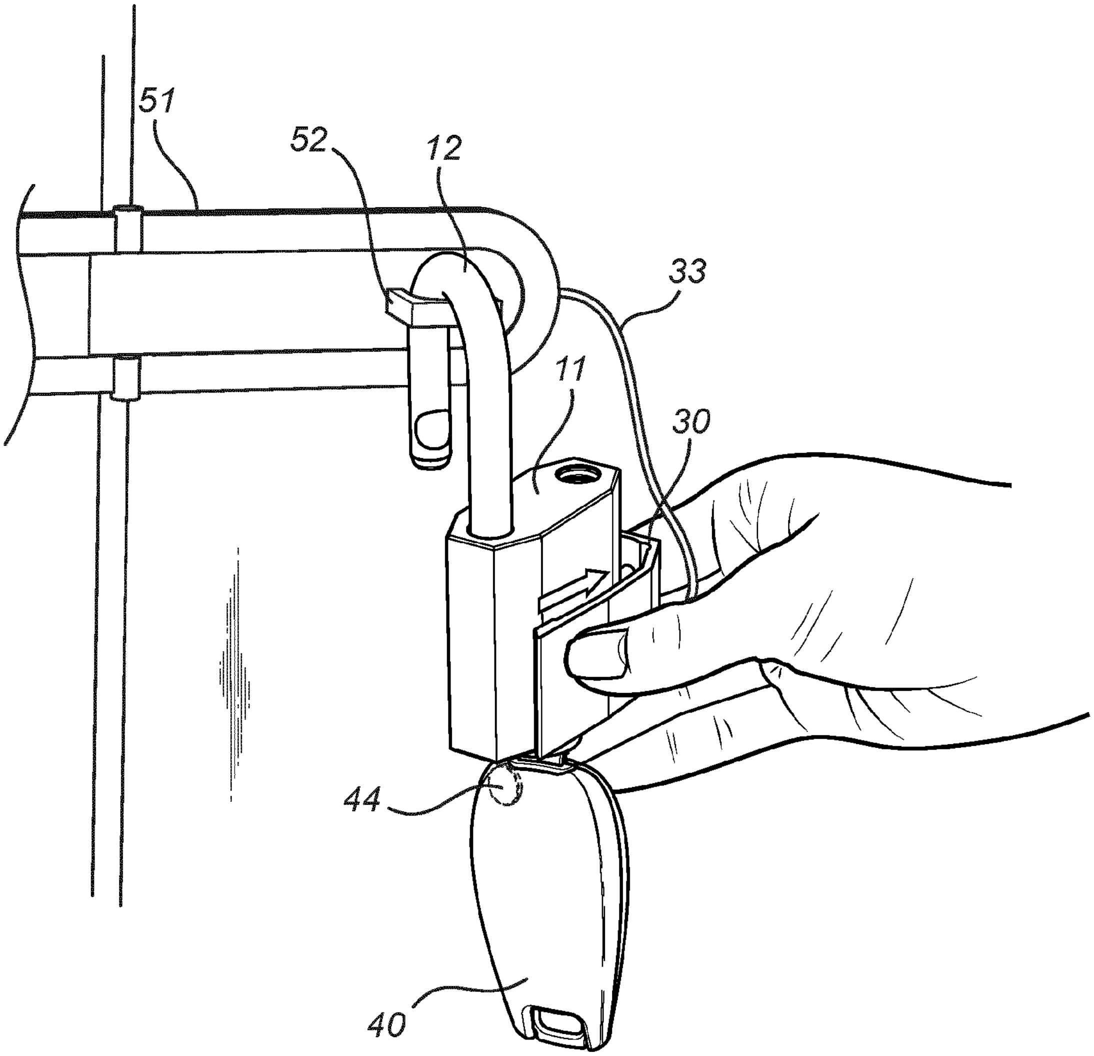
Figure 4A:
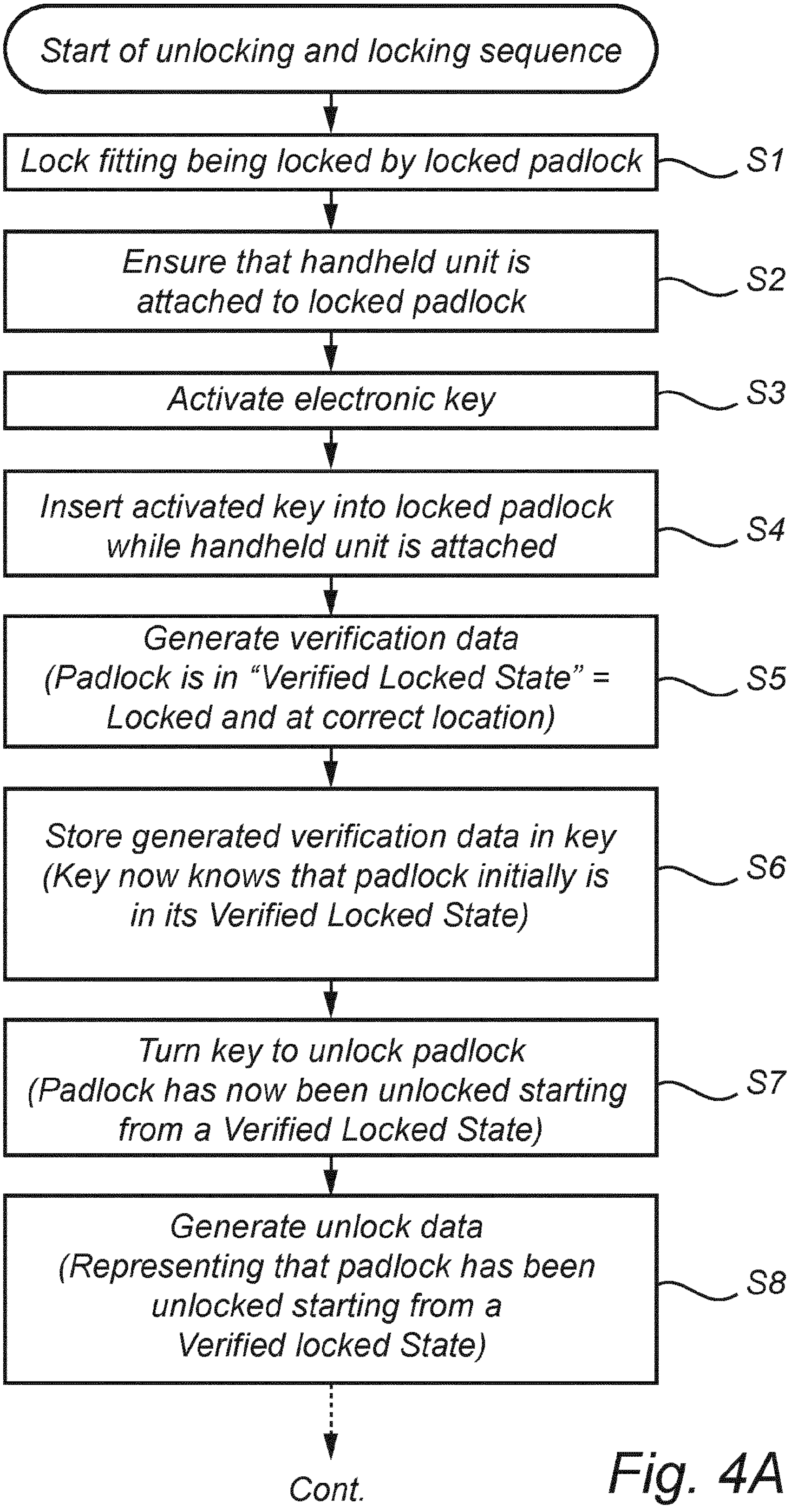

In FIG. 3C, the padlock 10 has been unlocked with the electronic key 40 turned 90 degrees, and the lock core 23 has thereby been rotated to its unlock position. The magnetic sensor 44 on the electronic key 40 has been rotated away from the magnet 31. The position detecting device of the electronic key 40 now detects a change in the magnetic flux sensed by the magnetic sensor 44. This is a change from the first magnetic flux to a different magnetic flux, or to no detected flux at all. A threshold arrangement may be used for forming a digital signal, where 1 represents the first magnetic flux and the locked position of the electronic key 40, and 0 represents a lower detected magnetic flux (or no flux at all) and the unlocked position of the electronic key 40. Since the padlock 10 has been unlocked from a verified locked state (locked+first flux detected), the position detection device generates unlock data (Step S8). The unlock data is stored in the electronic key 40 (Step S9). The user now removes the opened padlock 10 from the staple 52 (Step S10), and detach the handheld unit 30 from the padlock 10 (Step S11).

Figure 3D:
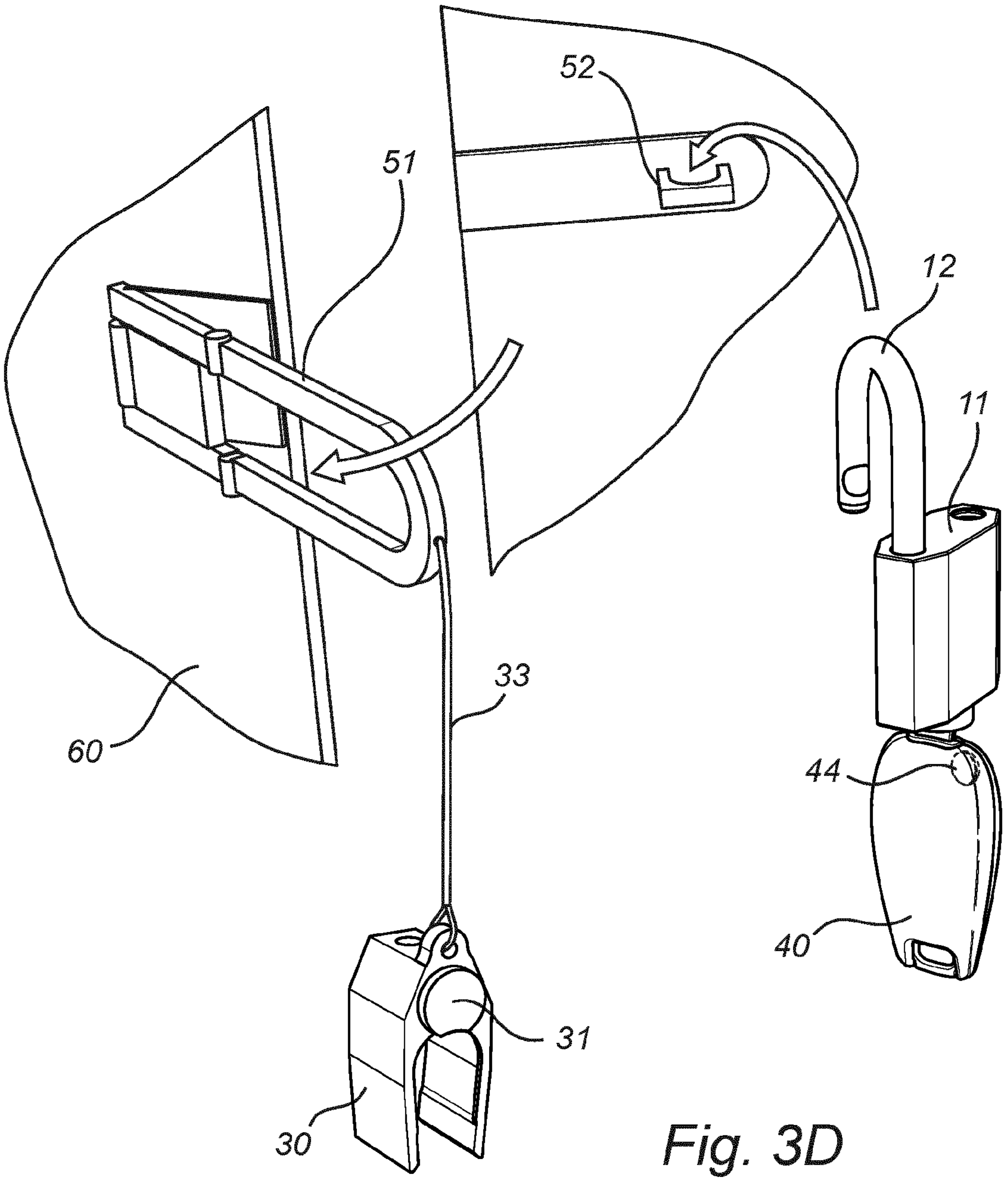
Figure 3E:
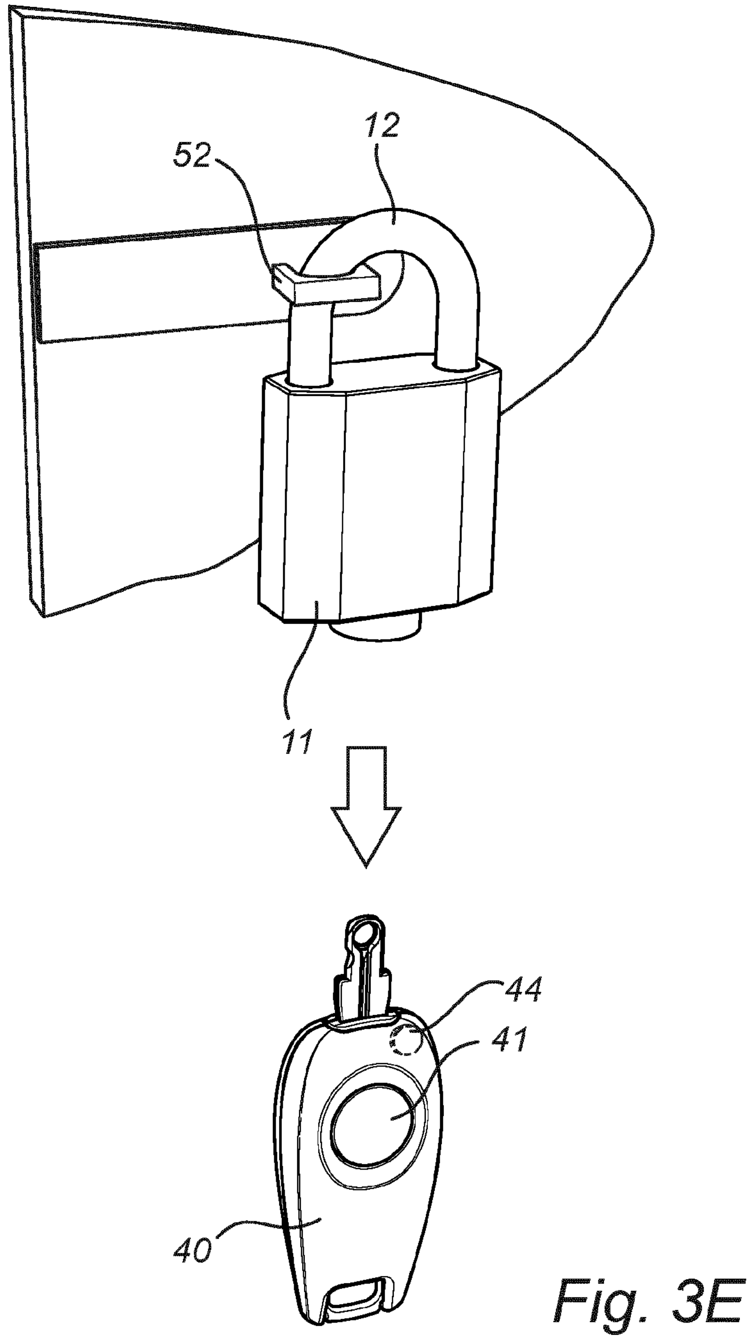

In FIG. 3D, the user is opening the unlocked hasp 51 in order to open the door 60. The user is putting the padlock 10 aside by temporarily hanging it in the staple 52, now without the handheld unit 30 attached. In the illustrated embodiment, the key 40 can be withdrawn from the padlock 10 only if the padlock is locked. In order not to leave the key 40 unguarded, in FIG. 3E the user temporarily locks the padlock to the staple 52 in order to withdraw the key 40. It should be noted that the padlock 40 in FIG. 3E is not in its verified locked state since the magnet 31 was not in position when the padlock 10 was locked. Accordingly, the lock position of the 40 was not detected by the magnetic sensor, and no lock verification data was generated. The key 40, having stored the previously generated unlock confirmation data, is therefore still waiting for the required locking acknowledgment in the form of lock verification data.

Figure 3F:
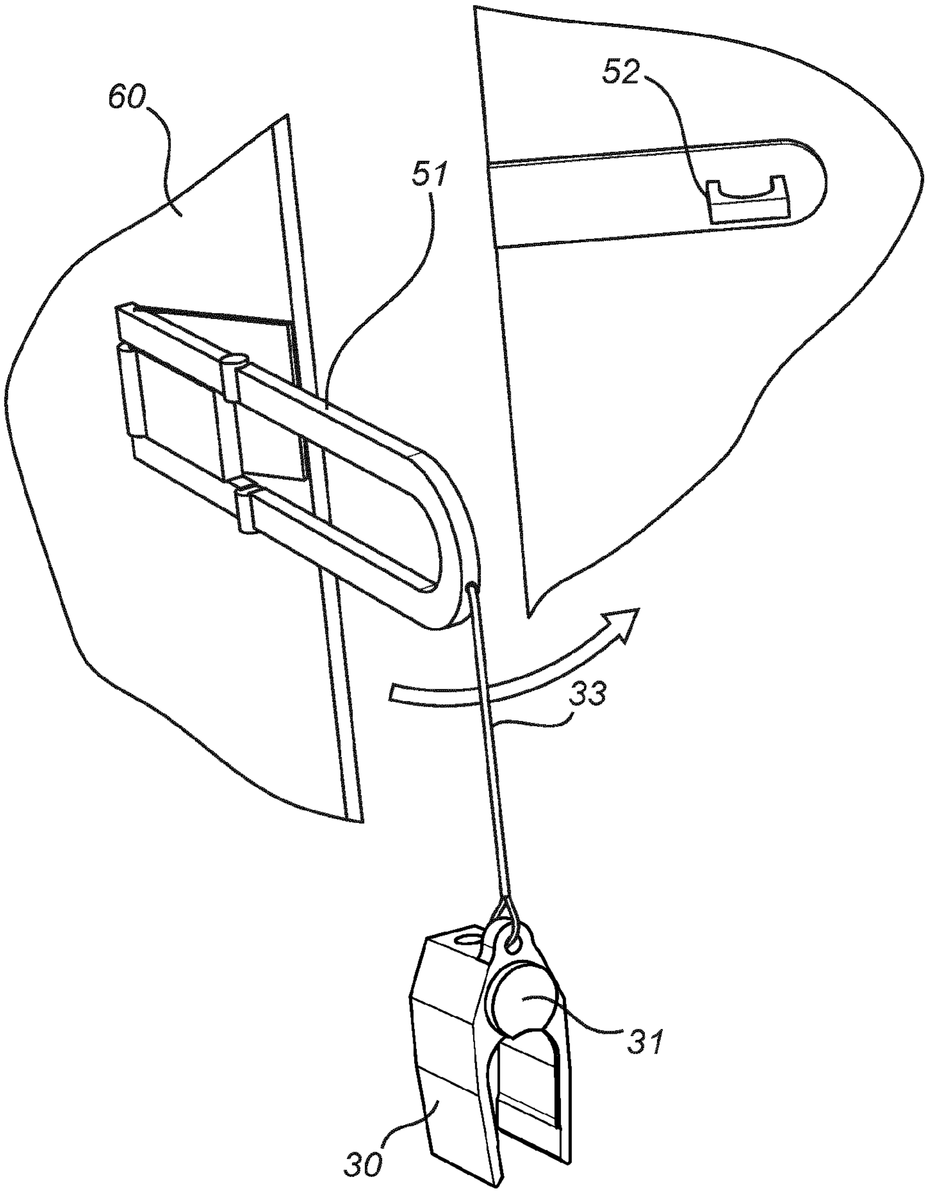
Figure 3G:
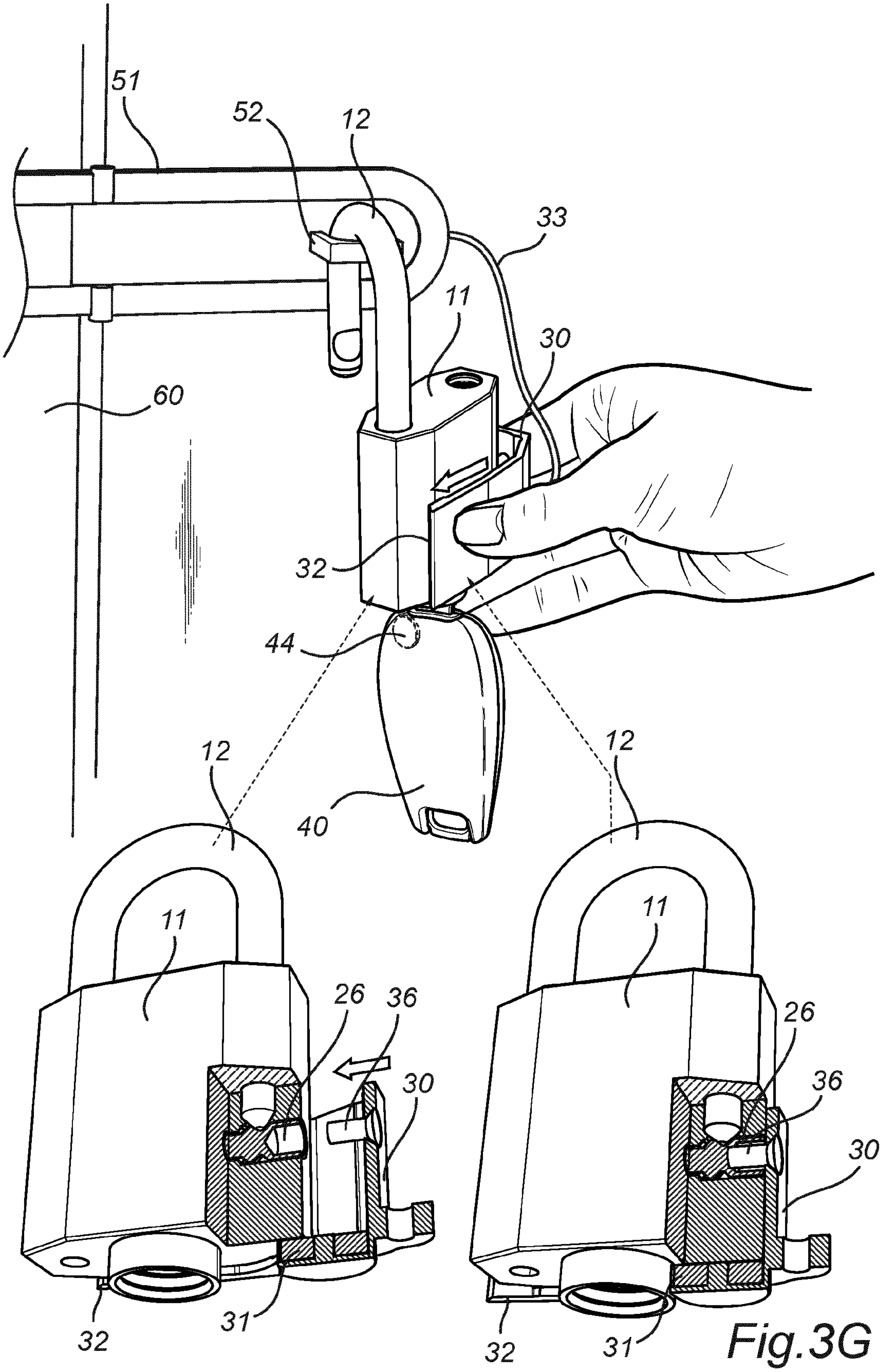

In FIG. 3F, the user is initiating the procedure for closing and relocking the door 60. The hasp 51 with the handheld unit 30 attached thereto is swung back over the hasp 52. The handheld unit 30 is hanging freely in the relatively short connector member 33.

In FIG. 3G, the padlock 10 has been unlocked. FIG. 3G shows status of the arrangement where the user has inserted the key 40 and unlocked the padlock 10 by rotating the key, and thereafter is attaching the handheld unit 30 to the unlocked padlock as illustrated in FIG. 3G (Step S13). In this alternative, no new unlock confirmation data is generated since the padlock 10 was not unlocked from a verified locked state (handheld unit 30 not attached during unlocking). As an alternative procedure, the user reattaches the handheld unit 30 before inserting the key 40. In this alternative, new lock verification data may be generated and stored when the key 40 is inserted.

Figure 3H:
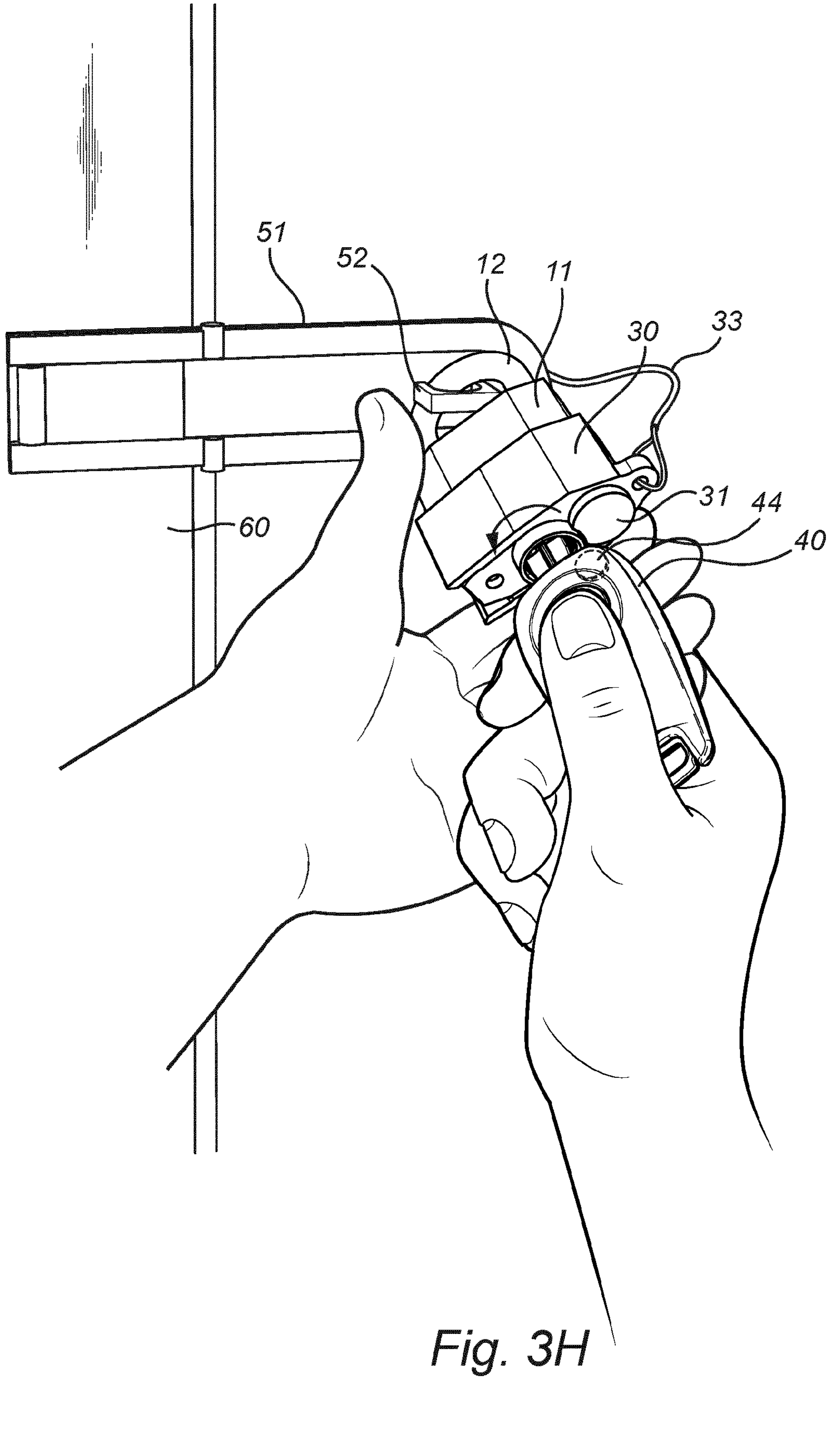

In FIG. 3H, the user turns the electronic key 40 to relock the padlock 10 (Step S14). The key 40 is thereby rotated to its lock position in which the magnetic sensor 44 again detects said first magnetic flux from the attached magnet 31. In response thereto, the position detection device of the key 40 detects the lock position of the key. In this embodiment, the position detection device generates lock verification data (Step S15) in response to this detection. The key 40 has now the awaited lock verification data as an acknowledgement or receipt that the previously opened padlock 10 has been locked into a verified locked state (Step S16). As a preferred option, the key acknowledges e.g. by a brief LED flashing that the verified locked state has been obtained (Step S17), that is the padlock 10 has been locked and it has been locked in the correct location with the handheld unit 30 attached. This is done before the key 40 is withdrawn. In preferred embodiments, the key 40 is able to provide such acknowledgement if it is in its inserted position.

Figure 3I:
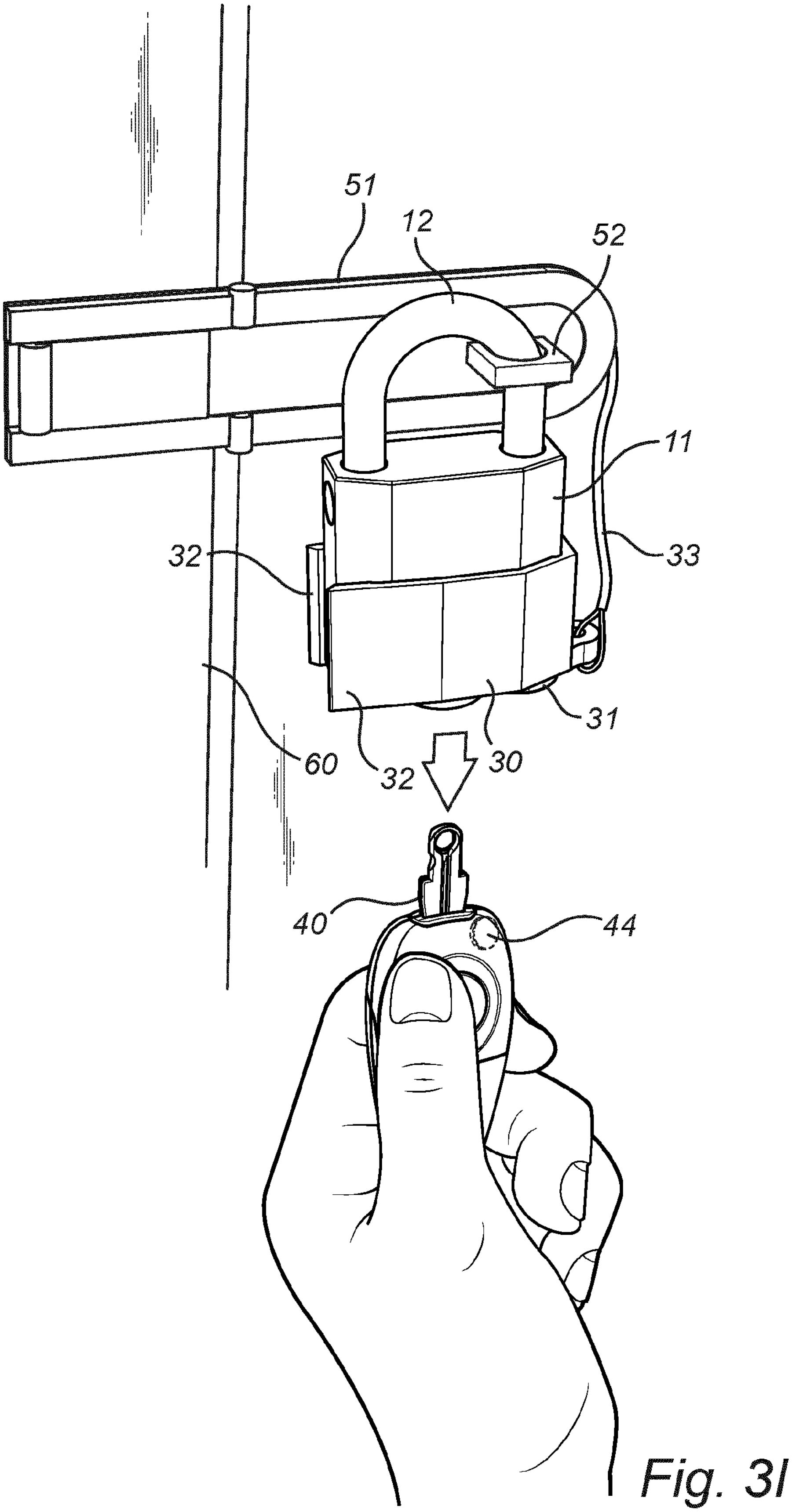

In FIG. 3I, having received the acknowledgement from the key 40 that the padlock 10 has been correctly relocked at the correct location, the user withdraws the key 40 and leaves the location. In preferred embodiments, the padlock 10 is designed such that the key 40 can be withdrawn from the padlock 10 only if the latter is in its locked state.

Reference is now made to FIG. 5, illustrating a system where the inventive arrangement and method are implemented. The user is carrying the electronic key 40 and a mobile phone 110 or similar portable electronic device provided with an associated app. In the illustrated embodiment, the key 40 and the mobile phone 110 may communicate wirelessly, e.g. via Bluetooth, and the mobile phone 110 may in its turn communicate via the cloud service 120. The key 40 may also, or as an alternative to the communication with the phone 110, wirelessly communicate with a cloud service 120 via a wireless gateway 140 arranged at the site where the lock fitting 50 is located. As a further alternative or addition, the key 40 may communicate with a synchronization unit 130. The synchronization unit 130 may be located at an office or in a car as an example. As a non-limiting illustrative example, a user may insert the key 40 into the synchronization unit 130 at the beginning of the day to load access codes into the key 40. At the end of the day, the user reinserts the key 40 into the synchronization unit 130 for removing the access codes and for transferring log data. Using one or more of these communication paths, the electronic keys 40 may receive updated authorization data on a daily basis.

The overall system may use geofence technology designed such that when a user moves away more than a predetermined distance from the location of the lock fitting 50 and the padlock 10, such as more than 50 meters, the mobile phone 110 establishes contact with the electronic key 40 to receive an acknowledgement that the padlock 10 is in the verified locked state. In this manner, a complete log file may be collected in the mobile phone 110 and transmitted further to the cloud service 110 and/or the synchronization unit 130. Incorrect locking procedures where acknowledgement were not received may also be stored in the key 40 and subsequently transferred as error log data to the mobile phone 110 or directly to the cloud service 120 or the synchronization unit 130.

If the app has correctly received a verified locked state acknowledgement, the app provides a message to the user as a receipt that it has received a correct acknowledgement. On the other hand, if the app does not receive any verified locked state acknowledgement from the key 40, the app may generate a warning signal (light/sound) and a message on the mobile phone to the user with a text like "Check that you have locked the padlock at the correct location!". This procedure may be repeated either until the user acknowledges the warning, or until the app correctly receives a verified locked state acknowledgement from the key 40.

As an alternative, the programmable key 40 may be programmed to start blinking in a predetermined sequence in a situation where the user has first unlocked a padlock from a verified locked state (handheld unit 30 attached) but subsequently failed within a predetermined period, e.g. 30 minutes, to lock the padlock 10 correctly again with the handheld unit 30 attached.

2nd Embodiment of Handheld Unit

Figure 6A:
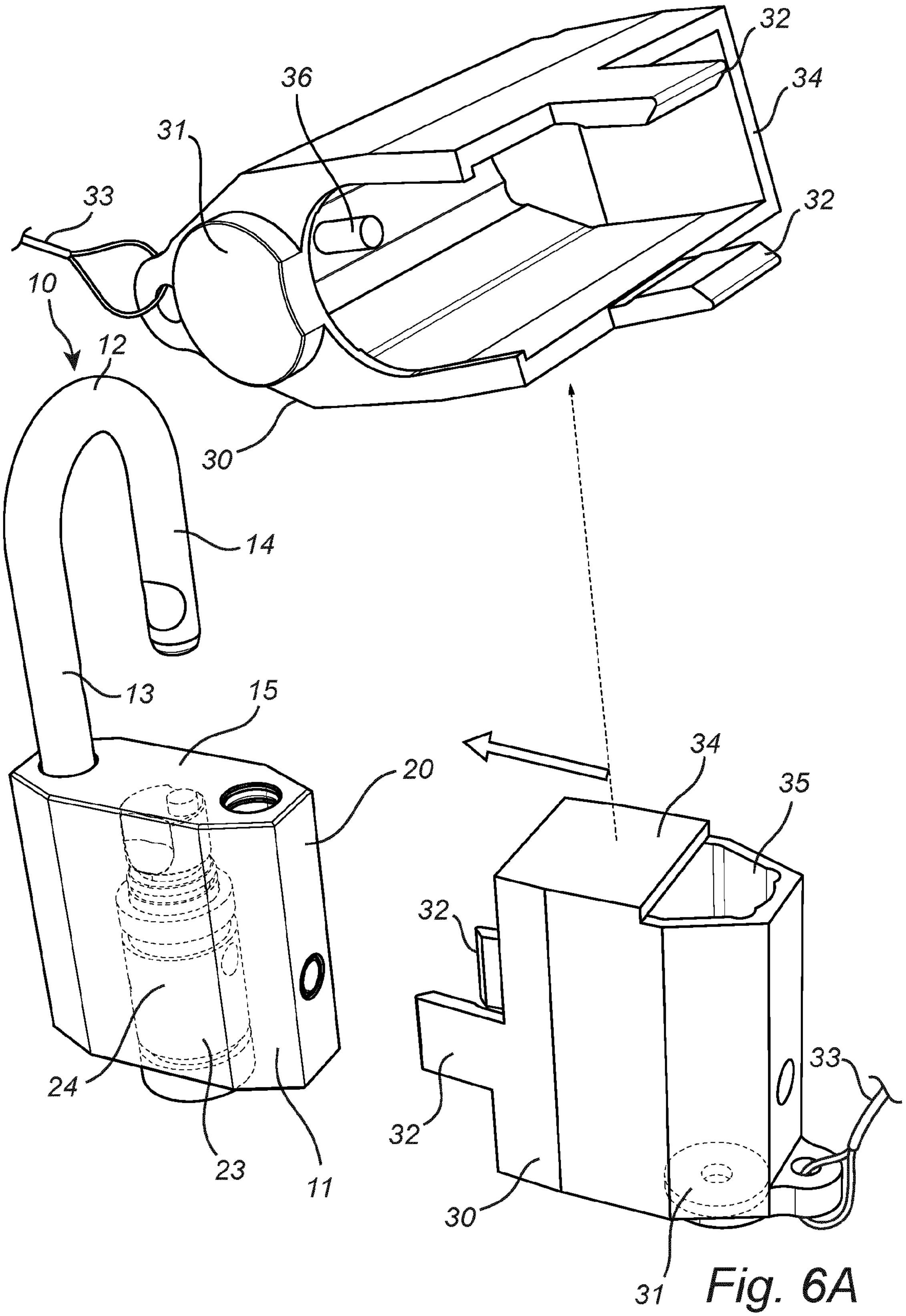
FIGS. 6A-6C show a padlock arrangement according to a second embodiment.
Figure 6B:
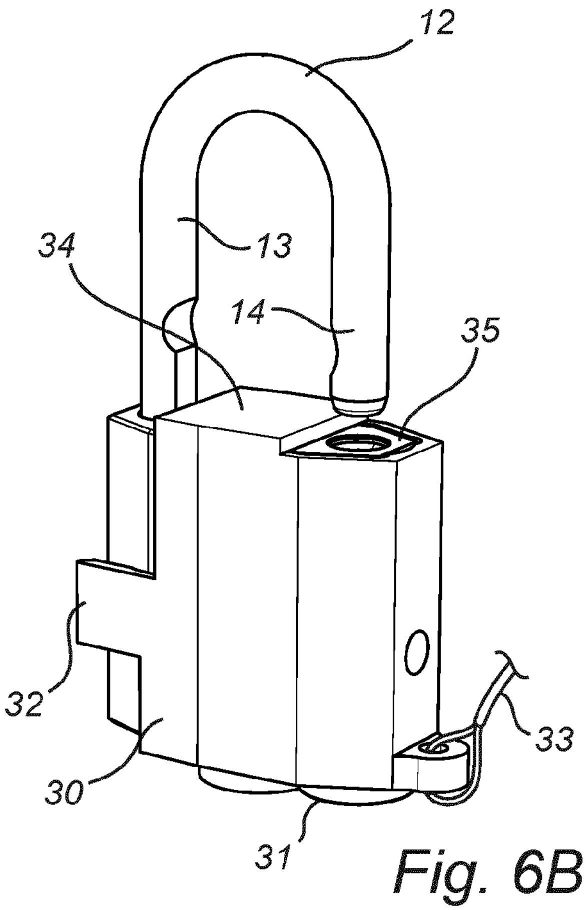
Figure 6C:
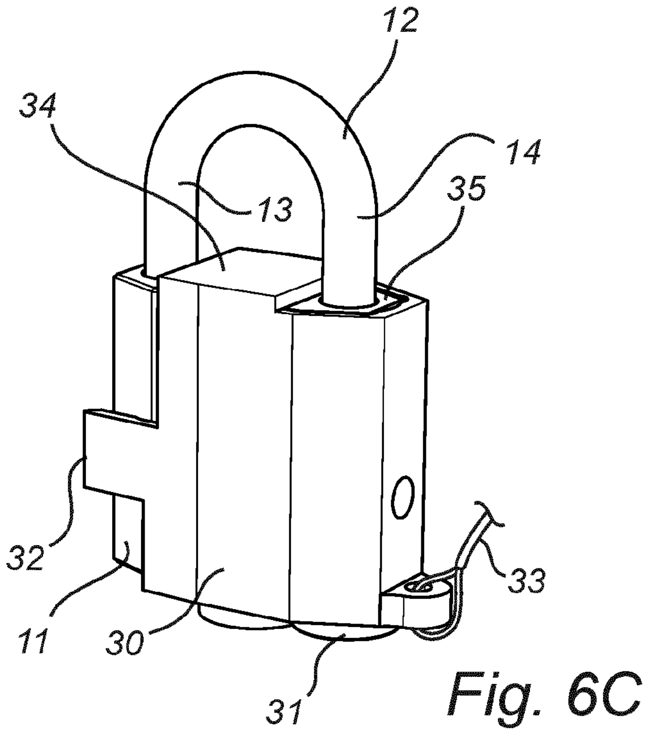

Reference is now made to FIGS. 6A-6C illustrating a second embodiment of the handheld unit 30. Like parts have the same reference numerals as in the first embodiment. What has been described above for the handheld unit 30 in the first embodiment also applies to this second embodiment, especially the functional part thereof and stated optional features. The handheld unit 30 according to the second embodiment is designed such that it may be locked to the padlock 10 by using the shackle 12 of the padlock 10. The attachment as such is still of the kind which allows the handheld unit 30 to be removed from the padlock housing 11, but in this embodiment such removal may be prevented when the padlock 10 is in its locked state (FIG. 6C). To this end, the handheld unit 30 further comprises a top part 34 covering part of the top surface 15 of the housing 11 between the legs 13 and 14 of the shackle 12. The handheld unit 30 comprises an opening 35, in this embodiment formed in or next to the top part 34 at the location of the free end 14 of the shackle 12. When the handheld unit 30 is in its position of use, the opening 35 will receive the free shackle end 14 when the padlock 10 is locked, thereby locking the handheld unit 30 to the padlock 10. As shown in FIGS. 6A-6C, the design may also be such that the height of the handheld unit 30 corresponds to the height of the padlock housing 11.

Embodiments with Optional Back End Database

A padlock arrangement according to the inventive concept may optionally be implemented with a functionality which will be described by way of a non-limiting example with reference to FIG. 7. In such embodiments, the electronic key 40 is arranged to communicate with a database 122, which may form part of a cloud service 120 which communicates with the electronic key 40 via one or more communication channels as illustrated in FIG. 5. The database 122 includes a main padlock list 124 which contains information or data for all padlocks in a given system. For each padlock in the system, a unique padlock ID is stored in the main padlock list 124. For illustrative purposes only, these unique padlock ID:s are labelled ID #1, ID #2, etc. in FIG. 7. Furthermore, in embodiments including said further functionality, the main padlock list 124 also contains an enhanced security marker or tag 126 for one or more of the padlock ID:s in the main padlock list 124. The markers 126 are set or not set by the user of the system. The marker 126 is set for padlocks intended to be operated in combination with a handheld unit 30. As an illustrative example in FIG. 7, ID #2, ID #5, ID #6, and ID #8 have an enhanced security marker 126, whereas the other padlock ID:s in the list 124 have no security marker. Padlocks having an enhanced security marker 126 in the main padlock list 124 will be handled differently by the electronic key 40 and the system, compared to padlocks not having an enhance security marker.

As illustrated at reference numeral 128, a subset of the data in the main padlock list 124 is transferred or transmitted to the electronic key 40. The transmission may be performed in different ways, such as illustrated by the communication channels in FIG. 5. The subset of the data in the main padlock list 124 may be transferred from the cloud service 120 via a mobile phone 110 or the like to the electronic key 40. The subset of data may also, as indicated in FIG. 5, be transferred along other paths (reference numerals 120, 130, and 140) not including transfer via the mobile phone 110. The transferred subset of data is stored in a memory of the electronic key 40 as a key padlock list 46. For each padlock in the key padlock list 46, the transferred data contains at least the unique ID of the padlock, data corresponding to the enhanced security marker (such as 0 or 1), and the unlock code of the padlock. Thereby, the electronic key 40 is provided with data allowing the key 40 to unlock a corresponding subset of the total number of padlocks in the system, and also allowing the key 40 to store information about which of "its" padlocks that are to be operated with an enhanced security level using a handheld unit 30. The enhanced security marker is set for those padlocks in the system which are to be operated using a handheld unit 30 according to the inventive concept. This is considered as an "enhanced security level". If the same key 40 is able to unlock also padlocks to be operated without any handheld unit 30, such padlocks are not marked with an enhanced security marker. Different electronic keys 40 in a system may receive different subsets of data from the main padlock list 124 in order to be able to unlock different subsets of padlocks of the total number of padlocks in the system.

Figure 7:
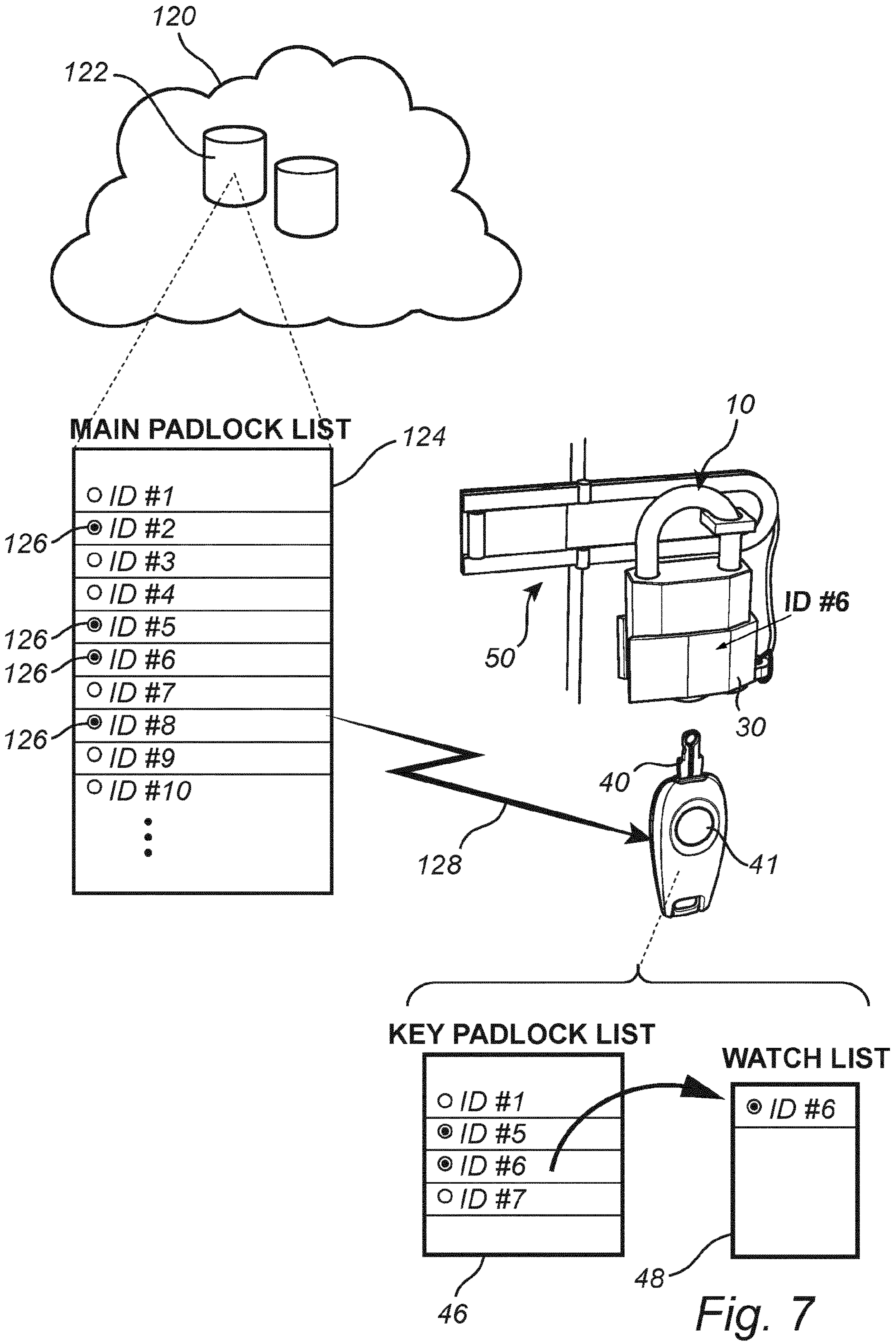
FIG. 7 illustrates an embodiment with a second security functionality.

In the embodiment illustrated in FIG. 7, the electronic key 40 further has a watch list 48 stored in the electronic key 40. In use of the system, the watch list 48 temporarily stores one or more of the unique keypad ID:s present in the key padlock list 46. However, only padlock ID:s having an enhanced security marker 126 are stored in the watch list 48 of the electronic key 40. Padlock ID:s with no marker 126 will not be stored in the watch list 48. As an example, the watch list 48 in FIG. 7 is illustrated in a state where it contains the ID for one single padlock only, ID #6. Initially, the watch list 48 may be empty.

The operation of the embodiment in FIG. 7 will now be described. It is assumed that the electronic key 40 has received and stored the subset of data in its key padlock list 46, and that the watch list 48 of the key 40 is initially empty. It is also assumed that the electromechanical padlock 10 in FIG. 7 is initially locked and that a handheld unit 30 has been attached to the locked padlock 10. Further, it is assumed that the unique ID of the padlock 10 in FIG. 7 is ID #6, and that ID #6 in the key padlock list 46 as well in the main padlock list 124 has an enhanced security marker 126.

As a first step, a user aiming at unlocking the padlock 10 with ID #6 inserts the electronic key 40 into the locked padlock 10. In some embodiments, the user may activate the key 40 by pressing the key button 44 (FIG. 3A) before or after key insertion. In other embodiments, the key 40 may be activated in response to key insertion. In response to key activation, the padlock 10 may be powered, for example by the electronic key 40.

In response to key activation, data communication is initiated between the electronic key 40 and the padlock 10. The key 40 sends an ID request to the padlock 10. In response, the padlock 10 transmits its unique ID to the key 40, in this example ID #6. Having received the padlock ID from the padlock 10, the key 40 searches its database or key padlock list 46 for the received padlock ID. Provided that the received padlock ID is found in the key padlock list 46 (i.e. the key 40 is able to unlock the padlock), the key 40 sends the corresponding unlock code to the padlock 10. When the unlock code 10 has been received by the padlock 10, the key 40 can be turned into its unlock position to unlock the padlock.

Provided that a padlock ID is received and that the received padlock ID has an enhance security marker 126 in the key padlock list 46 (which is the case for ID #6 in FIG. 7), then the unique padlock ID (ID #6) will be added to and temporarily stored in the key's watch list 48. As an illustrative example in FIG. 7, padlock ID #6 has been added to and temporarily stored in the watch list 48. The fact that a padlock ID is stored in the watch list 48 means or indicates that the electronic key 40 has sent a valid opening code to the padlock 10 which is associated with the stored padlock ID, and that this padlock 10 is to be operated together with a handheld unit 30 according to the inventive concept for enhance security purposes. The purpose of the watch list 48 is to keep track of padlocks for which the electronic key is waiting for a lock verification, which is generated only when the padlock is being locked at the correct location, i.e. with the handheld unit 30 being attached to the padlock 10.

In order to remove a padlock ID from the warning list 48 of the electronic key 48, the handheld unit 30 must be attached to the padlock, and lock verification data must be generated by the electronic key 40 by using the magnetic sensor 44 detecting the first magnetic flux. If the handheld unit 30 is being attached correctly to the padlock 10, and if also the electronic key 40 is in its lock position, then the position detection device of the electronic key 40 detects the lock position of the electronic key 40, and in this embodiment also generates the lock verification data as described above. In response thereto, the electronic key 40 removes the corresponding padlock ID from the watch list 48, since the electronic key 40 now knows that the padlock 10 has been relocked at the correct position. On the other hand, if the padlock 10 with ID #6 is unlocked and relocked without the handheld unit 30 being attached, then ID #6 would remain in the watch list 48 as a warning or reminder that the padlock with ID #6 needs to be locked in the correct location with handheld unit 30 attached.

In some embodiments, storing a padlock ID in the watch list 48 of the electronic key 40 may be performed independently of presence of the handheld unit 30. Specifically, the electronic key 40 may be arranged to store the padlock ID of the padlock 10 in which it is inserted on condition that the key 40 receives a padlock ID which has an enhanced security marker in the key padlock list 46. As an example of such an embodiment, in FIG. 7 ID #6 could be stored in the watch list 48 even if the handheld unit 30 was not attached to the padlock 10 upon key insertion. This provides an additional level of security since the electronic key 40 still knows that it is to wait for the lock verification data to be generated, since the padlock with ID #6 is marked with an enhance security marker 126.

Embodiment using a watch list 48 as shown in FIG. 7 may be designed to response to the lock verification by enter a padlock ID into the watch list 48, and/or to remove a padlock ID from the watch list 48. In a first option, the arrangement is designed such that the watch list 48 contains a padlock ID as long as the corresponding padlock is open. When the padlock is subsequently locked and the magnet is sensed, the padlock's ID is removed from the watch list 48 since all is then "OK". In a second option, the arrangement is designed such that if the padlock is in its locked state, and the key is inserted into the locked padlock, the locked key position is detected via the magnet. This fact is be stored in the watch list as an indication that the key has been inserted into a locked padlock of the kind having an enhanced security marker 126.

As described in the first embodiments, the arrangement may be optionally be designed to produce a warning to a user if a padlock, having been unlocked with a handheld unit 30 attached, has not been locked again. This may be considered as a first type of warning ("You have forgotten to relock the padlock"). This first type of warning is reset if the padlock is relocked with the handheld unit 30 being attached. The embodiment in FIG. 7 may be considered as a second warning or security feature, allowing the electronic key 40 to know which of the padlocks in its key padlock list that are intended to be operated together with a handheld unit and which are not. These warning features may be used independently and in some embodiments together.

The invention claimed is:

1. A padlock arrangement for locking a lock fitting, comprising:

an electromechanical padlock;

an electronic key arranged to be inserted into the padlock to an inserted position in which the electronic key is rotatable between a lock position in which the padlock is locked, and an unlock position in which the padlock is unlocked, said electronic key being provided with a position detecting device having at least one magnetic sensor; and a handheld unit having at least one magnet, said handheld unit being movably connected to the lock fitting via a connector member and being detachably attached to the padlock in a position of use, wherein the position detecting device of the electronic key is arranged to detect the lock position of the electronic key, by the magnetic sensor detecting a first magnetic flux from the magnet of the handheld unit being attached to the padlock, as a verification that the padlock is locked and the handheld unit is attached to the padlock.

2. The padlock arrangement according to claim 1, wherein the position detecting device is further arranged, in response to the position detecting device detecting the lock position of the inserted electronic key via said first magnetic flux, to generate corresponding lock verification data representing said verification that the padlock is locked and the handheld unit is attached to the padlock; and wherein the electronic key is arranged to at least temporarily store said verification data generated by the position detecting device.

3. The padlock arrangement according to claim 1, wherein the position detection device is arranged to detect the lock position of the electronic key, by the magnetic sensor detecting said first magnetic flux, in response to at least one of:

the inserted electronic key being rotated to its lock position, the electronic key being inserted into the padlock when the latter is already locked before the electronic key is inserted, and a user activation of the inserted electronic key in its lock position.

4. The padlock arrangement according to claim 1, wherein the magnetic sensor is located outside the padlock when the electronic key is in its inserted position in the padlock.

5. The padlock arrangement according to claim 4, wherein the electronic key is arranged to be inserted at a bottom side of the padlock, said bottom side being defined by a plane, and wherein said at least one magnet of the handheld unit, when the latter is attached to the padlock, is located at least partly on a side of said plane facing away from the padlock.

6. The padlock arrangement according to claim 1, wherein the position detecting device is further arranged to detect also the unlock position of the electronic key, by the magnetic sensor detecting a magnetic flux change from said first magnetic flux, as a confirmation that the padlock has been unlocked while the handheld unit was attached to the padlock.

7. The padlock arrangement according to claim 6, wherein the arrangement is arranged to initiate a warning operation in response to the position detecting device of the electronic key having detected the unlock position of the electronic key but having not subsequently detected the lock position of the electronic key.

8. The padlock arrangement according to claim 1, wherein the handheld unit, in its position of use, extends over two or more sides of a housing of the padlock.

9. The padlock arrangement according to claim 1, wherein the handheld unit is configured to be resiliently and detachably attached to the padlock in its position of use.

10. The arrangement according to claim 1, wherein the padlock is provided with a padlock shackle;

wherein the handheld unit is provided with a shackle receiving opening; and wherein, when the handheld unit is in its position of use attached to the padlock, the shackle receiving opening is positioned to receive a free end of the padlock shackle for preventing the handheld unit from being detached from the subsequently locked padlock.

11. The padlock arrangement according to claim 1, wherein the connector member comprises an elongate flexible member, such as a chain or a wire.

12. The padlock arrangement according to claim 1, wherein the connector member has a length which is sufficient to allow the padlock to be held in a non-vertical spatial position for key operation, while the handheld unit being in its position of use attached to the padlock and while a shackle of the padlock at the same time is in engagement with the lock fitting.

13. The padlock arrangement according to claim 1, wherein said at least one magnetic sensor comprises at least one Hall element sensor.

14. A method for providing status of an electromechanical padlock, said method comprising:

removably attaching a handheld unit to a padlock, said handheld unit having at least one magnet and being movably connected via a connector member to a lock fitting to be locked by the padlock;

while the handheld unit is being in its position attached to the padlock, locking the padlock by turning an electronic key inserted into the padlock, said electronic key being provided with at least one magnetic sensor which, by said turning the electronic key for locking the padlock, is rotated to a rotational position where a first magnetic flux from the at least one magnet of the attached handheld unit is detected by the magnetic sensor, representing a verification that the padlock has been locked while the handheld unit is attached to the padlock.

15. The method according to claim 14, further comprising:

in response to detecting said first magnetic flux by the magnetic sensor, generating corresponding lock verification data in the electronic key representing said verification that the padlock has been locked while the handheld unit is attached to the padlock; and at least temporarily storing said generated verification data in the electronic key.

16. The method according to claim 14, wherein said first magnetic flux from the at least one magnet of the attached handheld unit is detected by the magnetic sensor in response to at least one of the actions of:

rotating the inserted electronic key to its lock position, inserting the electronic key into the padlock when the latter is already locked before the electronic key is inserted, and performing a user activation of the electronic key while the electronic key is in its lock position in the padlock.

17. The method as claimed in claim 14, further comprising, before locking the padlock:

in optional order: inserting the electronic key into the padlock while the padlock is locked, and attaching the handheld unit to the padlock; and while the handheld unit is being attached to the padlock, unlocking the padlock by turning the inserted electronic key, wherein said magnetic sensor, by said turning the electronic key to unlock the padlock, is rotated to detect a change in magnetic flux from said first magnetic flux to a second magnetic flux, or to a zero-magnetic flux, representing said confirmation that the padlock has been unlocked while the handheld unit was attached to the padlock.

18. The method as claimed in claim 17, further comprising, in response to said change in magnetic flux being detected, generating corresponding unlock confirmation data representing said confirmation that the padlock has been unlocked while the handheld unit was attached to the padlock; and at least temporarily storing said unlock confirmation data in the electronic key.

19. The method as claimed in claim 14, further comprising initiating initiate a warning operation in response to the magnetic sensor having detected the unlock position of the electronic key but having not subsequently detected the lock position of the electronic key.

* * * * *